(12) United States Patent
Scott et al.

(10) Patent No.: US 11,343,424 B1
(45) Date of Patent: May 24, 2022

(54) IMAGE CAPTURING METHOD AND ELECTRONIC DEVICE

(71) Applicant: ViewSonic International Corporation, New Taipei (TW)

(72) Inventors: Craig Cameron Scott, New Taipei (TW); Tsung-Tse Hung, New Taipei (TW); Yi-Jen Sheng, New Taipei (TW)

(73) Assignee: ViewSonic International Corporation, New Taipei (TW)

( * ) Notice: Subject to any disclaimer, the term of this patent is extended or adjusted under 35 U.S.C. 154(b) by 0 days.

(21) Appl. No.: 17/371,111

(22) Filed: Jul. 9, 2021

(51) Int. Cl.
H04N 5/232 (2006.01)
H04N 5/272 (2006.01)

(52) U.S. Cl.
CPC ... *H04N 5/232127* (2018.08); *H04N 5/23218* (2018.08); *H04N 5/23296* (2013.01); *H04N 5/272* (2013.01)

(58) Field of Classification Search
CPC ......... H04N 5/232127; H04N 5/23218; H04N 5/23296; H04N 5/272; H04N 5/003; H04N 13/0235; G02B 27/22; G06T 7/0038; G06T 7/0085; G06T 2207/10012
USPC ...................................................... 348/240.3
See application file for complete search history.

(56) References Cited

U.S. PATENT DOCUMENTS

| | | | | |
|---|---|---|---|---|
| 9,076,204 | B2 * | 7/2015 | Ogura | H04N 5/232133 |
| 9,609,224 | B2 * | 3/2017 | Hayashi | G03B 17/18 |
| 2012/0281132 | A1 * | 11/2012 | Ogura | G06T 5/003 |
| | | | | 348/E5.045 |
| 2015/0215545 | A1 * | 7/2015 | Hayashi | G03B 17/18 |
| | | | | 348/333.05 |
| 2016/0073089 | A1 * | 3/2016 | Ting | H04N 13/395 |
| | | | | 348/49 |
| 2019/0250804 | A1 * | 8/2019 | Voss | H04N 5/23216 |
| 2020/0371323 | A1 * | 11/2020 | Chern | H04N 13/243 |
| 2020/0404162 | A1 * | 12/2020 | Uno | H04N 13/296 |
| 2021/0168348 | A1 * | 6/2021 | Laganakos | H04N 5/232127 |
| 2021/0183041 | A1 * | 6/2021 | Li | H04N 7/181 |
| 2021/0250498 | A1 * | 8/2021 | Kim | H04N 5/23219 |
| 2021/0314471 | A1 * | 10/2021 | Wippermann | H04N 5/2259 |
| 2021/0360172 | A1 * | 11/2021 | Liu | H04N 5/232935 |

FOREIGN PATENT DOCUMENTS

| | | |
|---|---|---|
| CN | 105933678 | 9/2016 |
| CN | 109089048 | 12/2018 |
| TW | 201611571 | 3/2016 |

* cited by examiner

*Primary Examiner* — Pritham D Prabhakher
(74) *Attorney, Agent, or Firm* — JCIPRNET

(57) ABSTRACT

An image capturing method is provided. The method includes: shooting a monitoring scene at the same time through multiple image capturing devices to capture multiple images corresponding to multiple focal lengths at a same time point; recognizing a target area of each of the captured images according to multiple focal sections; keeping multiple target sub-images in the target areas of the images, in which multiple object images in the target sub-images are all focused; directly generated a single reconstructed image corresponding to the time point according to the target sub-images; and outputting the reconstructed image.

12 Claims, 20 Drawing Sheets

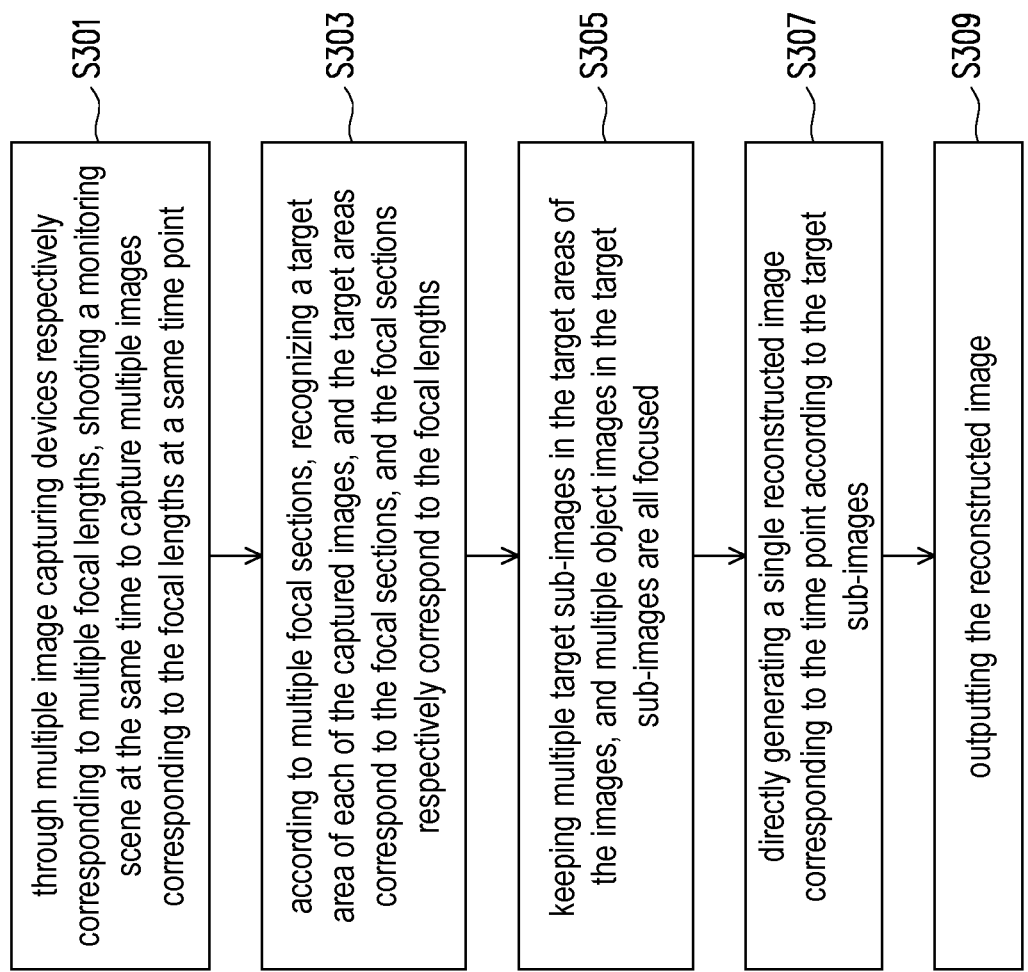

IMAGE CAPTURING METHOD AND ELECTRONIC DEVICE

BACKGROUND

Technical Field

The disclosure relates to an image capturing method, and more particularly, to an image capturing method and an electronic device using the image capturing method.

Description of Related Art

The conventional image recognition operation requires that an image of a target object in the recognized image (for example, a face image used for the face recognition operation) is clear. In order to obtain the clear image of the target object, the image capturing device needs to scan/align the target object, so that the focal length can be accurately located on the target object, thereby obtaining the clear image of the target object that has been focused.

However, in a situation where the total number of multiple target objects is large (more than two), in order to obtain a clear image of each of the target objects, it often takes a lot of time and resources due to the need to focus and shoot each of the target objects. As a result, the efficiency of the corresponding image capturing operation is low, and the subsequent image recognition operation requires consuming time and computing resources to receive and synthesize multiple images of the target objects.

SUMMARY

The disclosure provides an image capturing method and an electronic device, which may capture multiple images according to multiple focal lengths and recognize multiple target areas corresponding to the focal lengths in the images to obtain multiple target sub-images in the target areas, thereby generating a single reconstructed image corresponding to the time point according to the target sub-images. Multiple object images in the reconstructed image are all focused.

An embodiment of the disclosure provides an image capturing method suitable for an electronic device. The electronic device includes multiple image capturing devices. The image capturing devices respectively use multiple different focal lengths to shoot. The method includes as follows. A monitoring scene is shot at the same time through the image capturing devices respectively corresponding to the focal lengths to capture multiple images corresponding to the focal lengths at a same time point. A total number of the images is equal to a total number of the focal lengths. A target area of each of the captured images is recognized according to multiple focal sections. The target areas correspond to the focal sections, and the focal sections respectively correspond to the focal lengths. Multiple target sub-images in the target areas of the images are kept. Multiple object images in the target sub-images are all focused. A single reconstructed image corresponding to the time point is directly generated according to the target sub-images. The reconstructed image is output.

An embodiment of the disclosure provides an image capturing method suitable for an electronic device, and the electronic device includes a zoomable image capturing device. The method includes as follows. A monitoring scene is sequentially shot multiple times according to multiple focal lengths through the image capturing device to capture multiple images corresponding to the focal lengths. A total number of the images is equal to a total number of the focal lengths, and multiple time points of the images are continuous. A target area of each of the captured images is recognized according to multiple focal sections. The target areas correspond to the focal sections, and the focal sections respectively correspond to the focal lengths. Multiple target sub-images in the target areas of the images are kept. Multiple object images in the target sub-images are all focused. The sub-image is directly output. A single reconstructed image is directly generated according to the target sub-images. The reconstructed image is output.

An embodiment of the disclosure provides an electronic device. The electronic device includes multiple image capturing devices with a fixed focal length, a storage device, and a processor. The image capturing devices are configured to respectively use multiple different focal lengths to shoot. The storage device is configured to store data, and the data includes multiple program codes. The processor is configured to access and execute the program codes to implement an image capturing method. In addition, the image capturing devices are configured to shoot a monitoring scene at the same time to capture multiple images corresponding to the focal lengths at a same time point. A total number of the images is equal to a total number of the focal lengths. The processor is configured to recognize a target area of each of the captured images according to multiple focal sections. The target areas correspond to the focal sections, and the focal sections respectively correspond to the focal lengths. The processor is further configured to keep multiple target sub-images in the target areas of the images, and multiple object images in the target sub-images are all focused. The processor is further configured to directly generate a single reconstructed image corresponding to the time point according to the target sub-images, and the processor is further configured to output the reconstructed image.

An embodiment of the disclosure provides an electronic device. The electronic device includes a zoomable image capturing device, a storage device, and a processor. The image capturing device is configured to select one of multiple focal lengths to shoot. The storage device is configured to store data, and the data includes multiple program codes. The processor is configured to access and execute the program codes to implement an image capturing method. In addition, the image capturing devices is configured to sequentially shoot a monitoring scene multiple times according to the focal lengths to capture multiple images corresponding to the focal lengths. A total number of the images is equal to a total number of the focal lengths, and multiple time points of the images are continuous. The processor is further configured to recognize a target area of each of the captured images according to the focal sections. The target areas correspond to the focal sections, and the focal sections respectively correspond to the focal lengths. The processor is further configured to keep multiple target sub-images in the target areas of the images, and multiple object images in the target sub-images are all focused. The processor is further configured to directly generate a single reconstructed image according to the target sub-images. The processor is further configured to output the reconstructed image.

Based on the above, the image capturing method and the electronic device provided by the embodiments of the disclosure may shoot the monitoring scene according to the focal lengths to capture the images, and keep the target sub-image of each of the images according to the focal sections respectively corresponding to the focal lengths to directly generate and output the reconstructed image according to the target sub-images. In this way, without analyzing the images and not attaching/stitching the target sub-images, it is possible to quickly and efficiently enable the object images at multiple depths in the generated reconstructed image to be focused and clear, thereby improving the accuracy of the image recognition operation using the reconstructed image.

In order for the aforementioned features and advantages of the disclosure to be more comprehensible, embodiments accompanied with drawings are described in detail below.

BRIEF DESCRIPTION OF THE DRAWINGS

FIG. 3 is a flowchart of an image capturing method according to the first embodiment of the disclosure.

DETAILED DESCRIPTION OF DISCLOSED EMBODIMENTS

It is to be understood that both the foregoing and other detailed descriptions, features and advantages are intended to be described more comprehensively by providing an embodiment accompanied with drawings hereinafter. Directional terms used hereinafter, such as "upper," "lower," "front," "rear," "left" and "right," merely refer to directions in the accompanying drawings. Therefore, the directional terms are used to illustrate rather than limit the disclosure.

The First Embodiment

Figure 1:
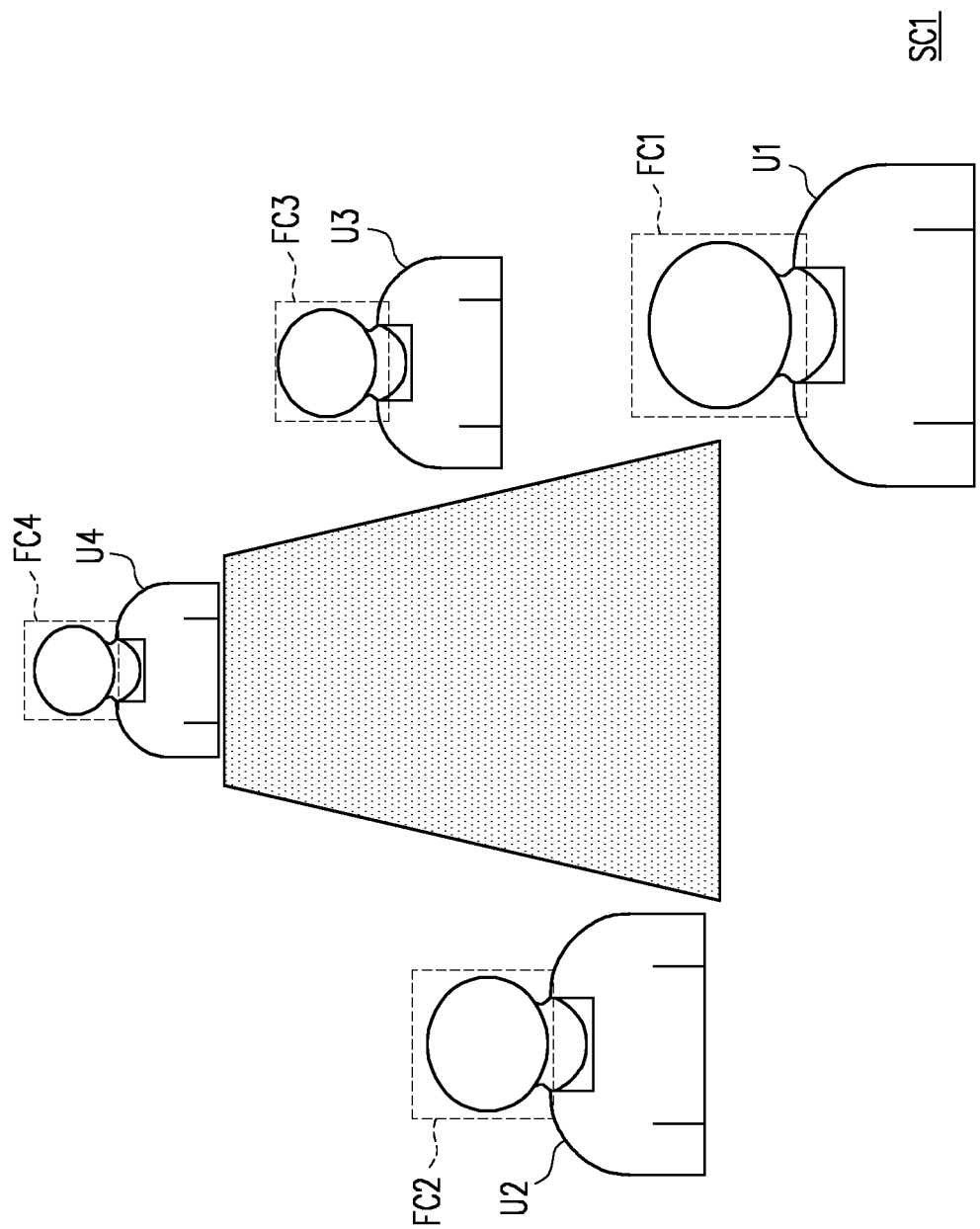
FIG. 1 is a schematic view of a monitoring scene according to the first embodiment of the disclosure.

FIG. 1 is a schematic view of a monitoring scene according to the first embodiment of the disclosure. Referring to FIG. 1, it is assumed that an image recognition device wants to recognize images (for example, face images FC1 to FC4 of users U1 to U4 in a monitoring scene SC1) of multiple specific objects in a scene (the monitoring scene SC1 as shown in FIG. 1). The monitoring scene SC1 is, for example, a conference room, and the users U1 to U4 are, for example, participants. However, the disclosure does not limit the types of the monitoring scene SC1 and the specific objects. For example, the monitoring scene SC1 may also be a classroom, and the users U1 to U4 are, for example, students.

Generally speaking, the image recognize device needs multiple images of the monitoring scene SC1 containing the images FC1 to FC4 of the specific objects provided by an image capturing device to perform an image recognition operation on the obtained images. The specific objects (also referred to as target objects) are located at different positions in the monitoring scene SC1, and distances between the target objects and the image capturing device configured to shoot the monitoring scene SC1 are different. If the image capturing device shoots the monitoring scene SC1 without performing focusing, the captured images FC1 to FC4 of the target objects in the image are blurred, and the corresponding image recognition operation may not be effectively performed on the images FC1 to FC4 of the target objects.

In order to capture the clear images FC1 to FC4 of the target objects, a conventional method is that the image capturing device uses a distance detection device (such as an infrared raging device or a laser raging device) to detect multiple distances between the image capturing device and the target objects to focus on the target objects according to the distances. Whenever one of the target objects is focused, the image capturing device shoots the monitoring scene SC1 once to obtain an image having the focused target object. In other words, in this scene, the conventional method requires at least four ranging operations, four focusing operations, and four shooting operations to obtain four qualified images for the image recognition operation. Then, the four qualified images are transmitted to the image recognition device. In addition, the image recognition device further needs to perform the image recognition operation once on each of the four qualified images (a total of four image recognition operations are performed) to obtain image recognition results of all the target objects. That is to say, for the above example of the monitoring scene SC1 with only four target objects, in order to output the qualified images applied in the image recognition operation, the image capturing device needs to consume a lot of time and resources (such as computing resources and storage space) to detect, capture, and transmit the images of the target objects. If the monitoring scene SC1 has more target objects, the overall time and resources consumed will increase significantly.

In order to solve the technical issue faced by the above conventional practice, an image capturing method and an electronic device provided by multiple embodiments of the disclosure may generate a single reconstructed image having the images of all the target objects in the monitoring scene for the image recognition. The images of the recognizable target objects in the reconstructed image are all clear or focused (in addition, the reconstructed image is a qualified image). In this way, in addition to increasing the speed of obtaining the reconstructed image, the image recognition device may further perform the image recognition by the single reconstructed image, thereby improving the efficiency of the overall image recognition operation. Hereinafter, specific details of the image capturing method and the electronic device of the disclosure are described with reference to FIG. 2, FIG. 3, and the first embodiment.

Figure 2:
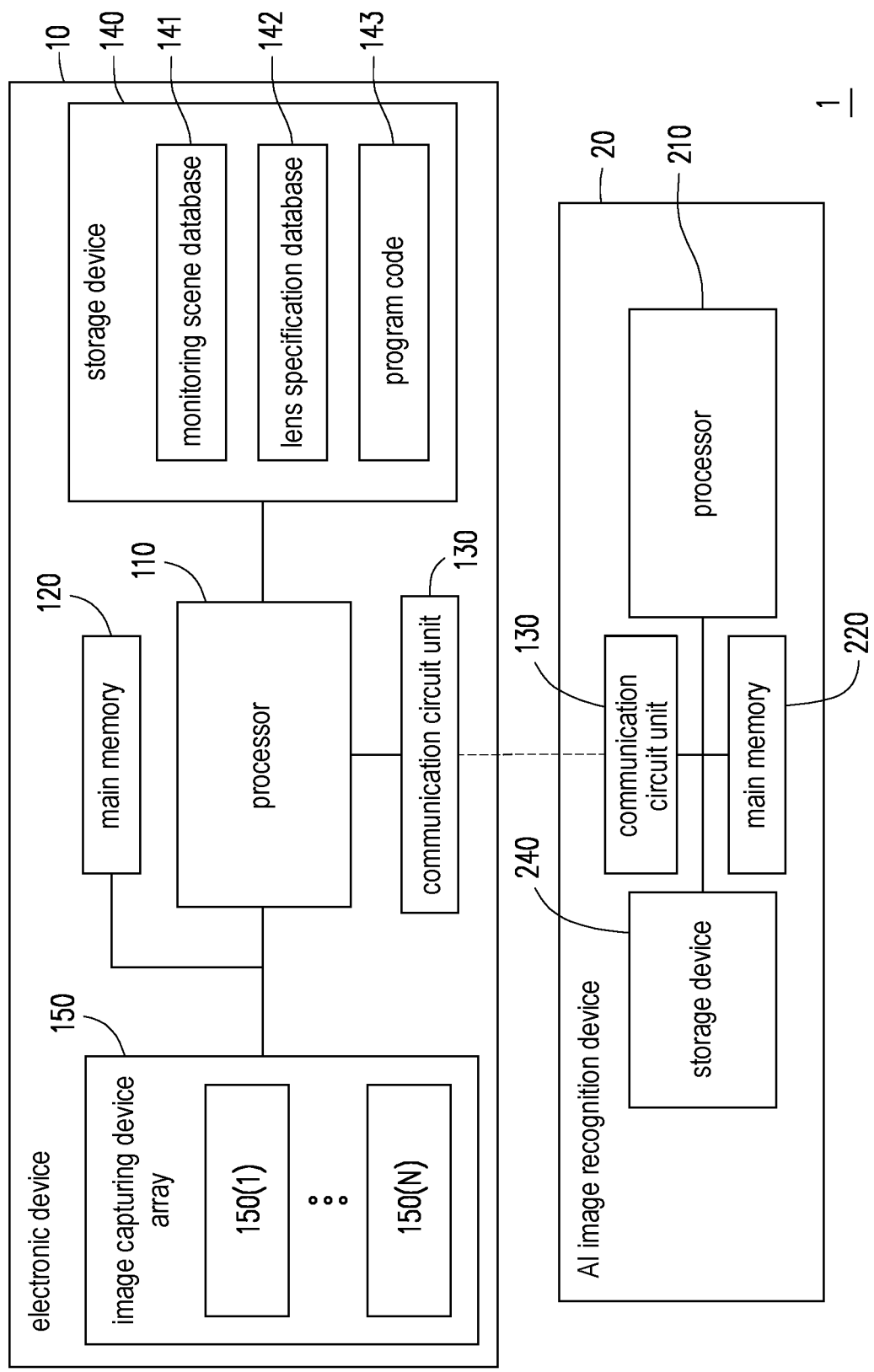
FIG. 2 is a schematic block view of an image recognition system according to the first embodiment of the disclosure.

FIG. 2 is a schematic block view of an image recognition system according to the first embodiment of the disclosure. Referring to FIG. 2, an image recognition system 1 of this embodiment includes an electronic device 10 and an artificial intelligence (AI) image recognition device 20. The electronic device 10 includes a processor 110, a main memory 120, a communication circuit unit 130, a storage device 140, and an image capturing device array 150. The processor 110 is electrically connected to the main memory 120, the communication circuit unit 130, the storage device 140, and the image capturing device array 150.

The AI image recognition device 20 includes a processor 210, a main memory 220, a communication circuit unit 230, and a storage device 240. The processor 210 is electrically connected to the main memory 220, the communication circuit unit 230, and the storage device 240.

In this embodiment, the processor 110 and the processor 210 are hardware with computing capabilities. The processor 110 is configured to access and execute one or more program codes to manage the operation of the overall electronic device 10. The processor 210 is configured to execute one or more program codes to manage the operation of the overall AI image recognition device 20. In this embodiment, the processor 110 and the processor 210 are, for example, a central processing unit (CPU) with one core or multiple cores, a programmable micro-processor, a digital signal processor (DSP), a programmable controller, an application specific integrated circuit (ASIC), a programmable logic device (PLD), or other similar devices.

The main memories 120 and 220 are configured to receive instructions of the processors 110 and 210 to temporarily store data. For example, the main memory 120 may temporarily store image data captured from the image capturing device 150. The main memory 220 may temporarily store data transmitted from the electronic device 10 (for example, the reconstructed image). The main memories 120 and 220 are, for example, a dynamic random access memory or a static random access memory.

The communication circuit unit 130 establishes a network connection in a wireless or wired manner to connect to the communication circuit unit 230, and then uses the established network connection to transmit the data. The communication circuit units 130 and 230 have, for example, a wireless communication circuit unit (not shown), and support one of a global system for mobile communication (GSM) system, a personal handy-phone system (PHS), a code division multiple access (CDMA) system, a wireless fidelity (WiFi) system, a worldwide interoperability for microwave access (WiMAX) system, a third-generation wireless communication technology (3G), a fourth-generation wireless communication technology (4G), a fifth-generation wireless communication technology (5G), a long term evolution (LTE), an infrared transmission, a Bluetooth communication technology, or a combination thereof. The disclosure is not limited thereto. In addition, the communication circuit units 130 and 230 may also have a wired communication circuit unit (not shown), and transmit or receive the data through wired communication.

The storage devices 140 and 240 are respectively configured to record some data that needs to be stored for a long time through the instructions of the processor 110 and the processor 210. The storage devices 140 and 240 may be any type of hard disk drive (HDD) or non-volatile memory storage device (for example, a solid state drive (SSD)). The data stored by the storage device 140 is, for example, firmware or software (for example, a program code 143) configured to manage the electronic device 10, and multiple databases (for example, a monitoring scene database 141, a lens specification database 142, or other suitable databases, etc.). The data stored by the storage device 240 is, for example, firmware or software configured to manage the AI image recognition device 20, and multiple databases (for example, a target image sample database, an AI image recognition model database, or other suitable databases, etc.).

In this embodiment, the processor 110 is configured to access and load the program code 143 to perform an image capturing operation, thereby implementing the image capturing method provided by the disclosure. In addition, the processor 210 is configured to execute multiple program codes to perform the image recognition operation on the received reconstructed image.

The monitoring scene database 141 is configured to record spatial information of each of multiple monitoring scenes. The spatial information includes, but is not limited to, a height, a width, and a depth of the monitoring scene. The lens specification database 142 is configured to record a lens specification of each of the image capturing devices 150(1) to 150(N). The lens specification is, for example, a focal length and effective field of view of a lens, etc. It should be noted that the above databases may also be updated through data transmitted through a network connection connected to the Internet or a local area network, or through data input by an input device.

The image capturing device array 150 includes multiple image capturing devices 150(1) to 150(N). N is a positive integer greater than 1. Each of the image capturing devices 150(1) to 150(N) is, for example, a video camera having a function of capturing image data or a camera. The image capturing devices 150(1) to 150(N) are configured to respectively shoot the monitoring scene SC1. Each of the image capturing devices may include a lens, a photosensitive element, an aperture, etc. The lens is, for example, a standard lens, a wide-angle lens, and a zoom lens. The photosensitive element is, for example, a charge coupled device (CCD), a complementary metal-oxide semiconductor (CMOS) device, or other elements. The lens, the photosensitive element, or a combination thereof are not limited here. Each of the image capturing devices may continuously capture (shoot) multiple images, that is, capture (shoot) a dynamic image (also referred to as a video stream). The image capturing device may also capture (shoot) a single static image. The dynamic image or the static image are temporarily stored in the main memory 120, so that the processor 110 may perform further processing on the dynamic image or the static image.

FIG. 3 is a flowchart of an image capturing method according to the first embodiment of the disclosure. Referring to FIG. 3, in step S301, through multiple image capturing devices respectively corresponding to multiple focal lengths, a monitoring scene is shot at the same time to capture multiple images corresponding to the focal lengths at a same time point.

Specifically, in the first embodiment, focal lengths of the image capturing devices 150(1) to 150(N) are preset to different fixed focal lengths. The image capturing devices 150(1) to 150(N) each uses the preset fixed focal lengths to shoot the monitoring scene SC1 at the same time. In other words, at each time point, N image capturing devices may capture/output N images of the monitoring scene SC1 at the same time. The N images are temporarily stored in the main memory 120.

Next, in step S303, according to multiple focal sections, the processor 110 recognizes a target area of each of the captured images. The target areas correspond to the focal sections, and the focal sections respectively correspond to the focal lengths.

Specifically, the focal sections are determined according to the focal length of each of the image capturing devices 150(1) to 150(N), the lens specifications, and a total number of the image capturing devices 150 (1) to 150(N). In more detail, for a first focal section in the focal lengths corresponding to a first image capturing device, a first focal length front distance from a starting point of the first focal section to a first focal length of a first image capturing device in the image capturing devices and a first focal length back distance from an end point of the first focal section to the first focal length are determined according to a first lens specification of the first image capturing device and the total number of the image capturing devices.

Figure 4A:
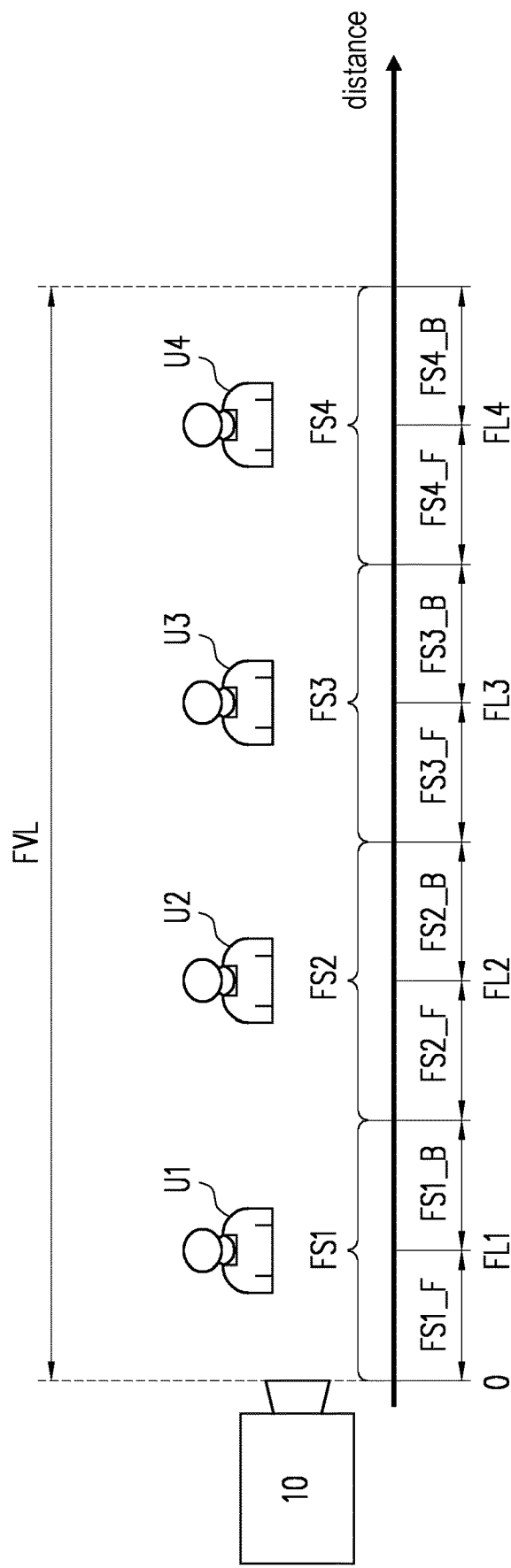
FIG. 4A is a schematic view of multiple focal sections corresponding to multiple focal lengths according to the first embodiment or the second embodiment of the disclosure.

FIG. 4A is a schematic view of multiple focal sections corresponding to multiple focal lengths according to the first embodiment or the second embodiment of the disclosure. Referring to FIG. 4A, for ease of description, N is set to 4 in the following embodiment. For example, assuming that each of the image capturing devices 150(1) to 150(4) has the same depth of field FVL (which may be known according to each of the image capturing devices 150(1) to 150(4)), the image capturing devices 150(1) to 150(4) are respectively set to focal lengths FL1 to FL4. In this embodiment, a sum of focal sections FS1 to FS4 of each of the image capturing devices 150(1) to 150(4) is set to be equal to the depth of view FVL. In addition, a focal length front distance FS1_F from a starting point of the focal section FS1 of the image device 150(1) to the focal length FL1 and a focal length back distance FS1_B from an end point of the focal section FS1 of the image device 150(1) to the focal length FL1 are determined according to a lens specification of the image capturing device 150(1) and the total number (for example, 4) of the image capturing devices 150. Similarly, a focal length front distance FS2_F from a starting point of the focal section FS2 of the image device 150(2) to the focal length FL2 and a focal length back distance FS2_B from an end point of the focal section FS2 of the image device 150(2) to the focal length FL2 are determined according to a lens specification of the image capturing device 150(2) and the total number of the image capturing devices 150. A focal length front distance FS3_F from a starting point of the focal section FS3 of the image device 150(3) to the focal length FL3 and a focal length back distance FS3_B from an end point of the focal section FS3 of the image device 150(3) to the focal length FL3 are determined according to a lens specification of the image capturing device 150(3) and the total number of the image capturing devices 150. A focal length front distance FS4_F from a starting point of the focal section FS4 of the image device 150(4) to the focal length FL4 and a focal length back distance FS4_B from an end point of the focal section FS4 of the image device 150(4) to the focal length FL4 are determined according to a lens specification of the image capturing device 150(4) and the total number of the image capturing devices 150.

Figure 4B:
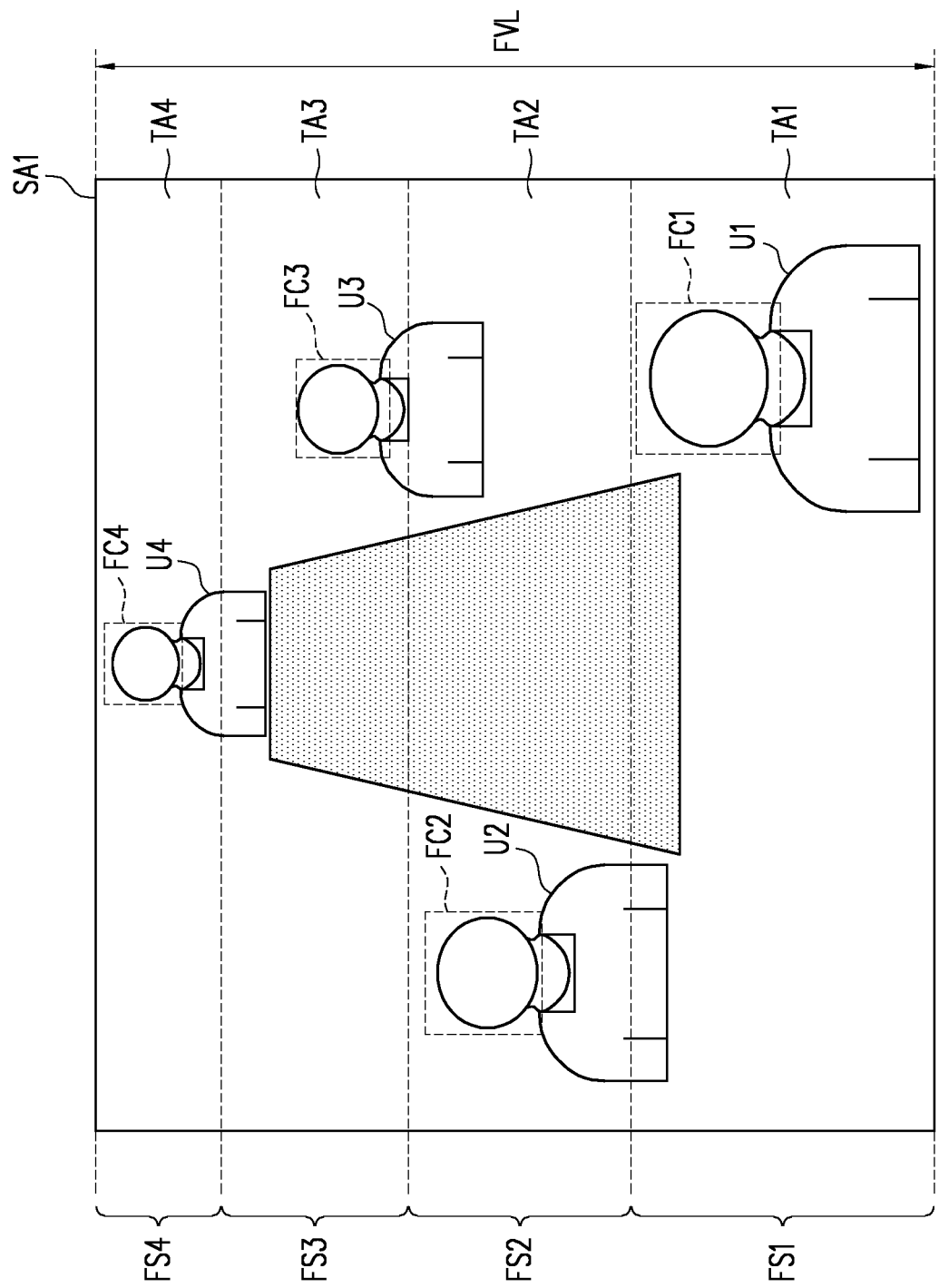
FIG. 4B is a schematic view of a shooting area of the monitoring scene and the corresponding focal sections according to the first embodiment of the disclosure.

FIG. 4B is a schematic view of a shooting area of the monitoring scene and the corresponding focal sections according to the first embodiment of the disclosure. Referring to FIG. 4B, specifically, as described above, the monitoring scene database records spatial information of the monitoring scene SC1. In addition, the spatial information includes a height, a width, and a depth of the monitoring scene SC1. According to the spatial information of the monitoring scene, the focal sections corresponding to the image capturing devices, and the lens specifications corresponding to the image capturing devices, a position, a shape, and a size of the target area of each of the images are determined. For example, for the image captured by the image capturing device 150(1) in the images, the processor 110 determines a position, a shape, and multiple side lengths of a target area TA1 in the image according to one or more of the height, the width, and the depth of the spatial information of the monitoring scene SC1, the focal section FS1 corresponding to the image capturing device 150(1), and the lens specification corresponding to the image capturing device 150(1). The lens specification of the image capturing device 150(1) may determine a shooting area SA1 corresponding to the monitoring scene SC1, and a depth of the shooting area SA1 is the depth of view FVL. A range of the image captured by the image capturing device 150(1) is a range of the shooting area SA1.

Returning to FIG. 3 again, next, in step S305, the processor 110 keeps multiple target sub-images in the target areas of the images, and multiple object images in the target sub-images are all focused.

Specifically, for the image captured from the image capturing device, the processor 110 only keeps image information (for example, pixels value of multiple pixels) in the target area according to the recognized target area in the image. The image information may be regarded as the target sub-image in the image. It should be noted that in another embodiment, the image capturing device 150(1) may also recognize the target area TA1 by itself. In an embodiment, the processor 110 recognizes a removal area outside the target area according to the recognized target area in the image, so as to delete the image information in the removal area. Hereinafter, FIGS. 5A to 5C, 6A to 6B, 7A to 7B, and 8A to 8B are used for illustration.

Figure 5A:
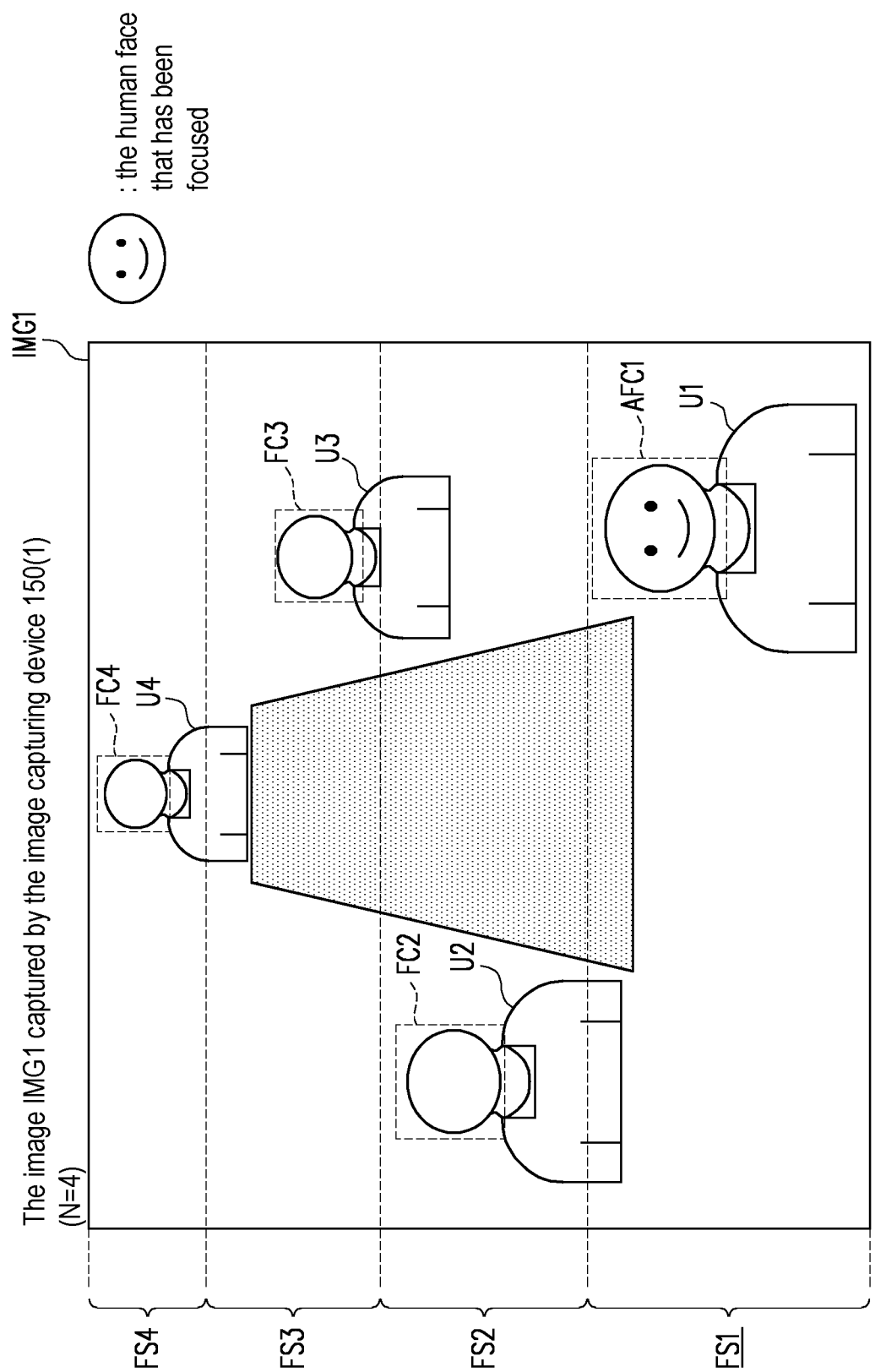
FIG. 5A is a schematic view of a captured image IMG1 corresponding to a focal section FS1 according to the first embodiment of the disclosure.
Figure 5B:
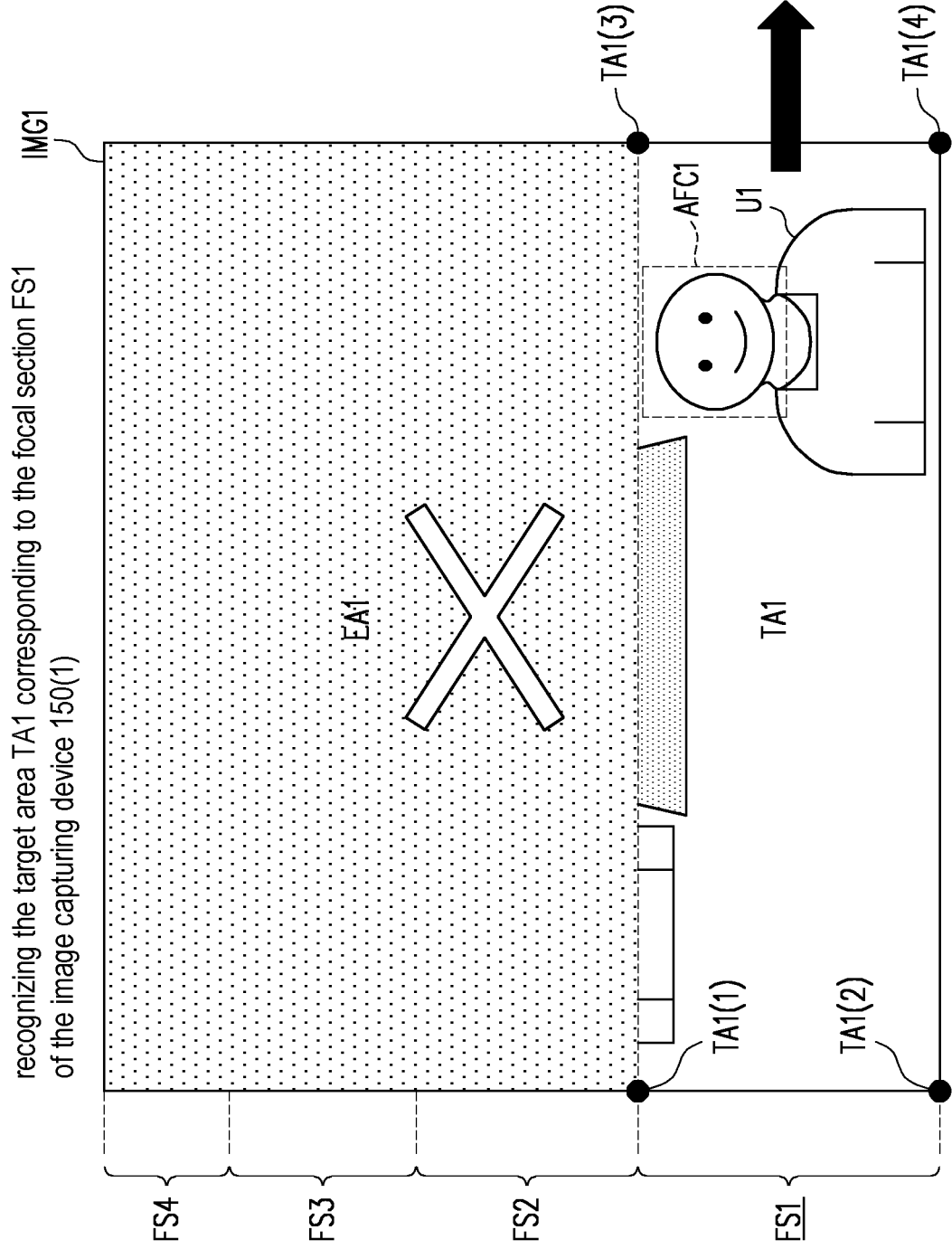
FIG. 5B is a schematic view of recognizing a target area TA1 corresponding to the focal section FS1 in the image IMG1 according to the first embodiment of the disclosure.
Figure 5C:
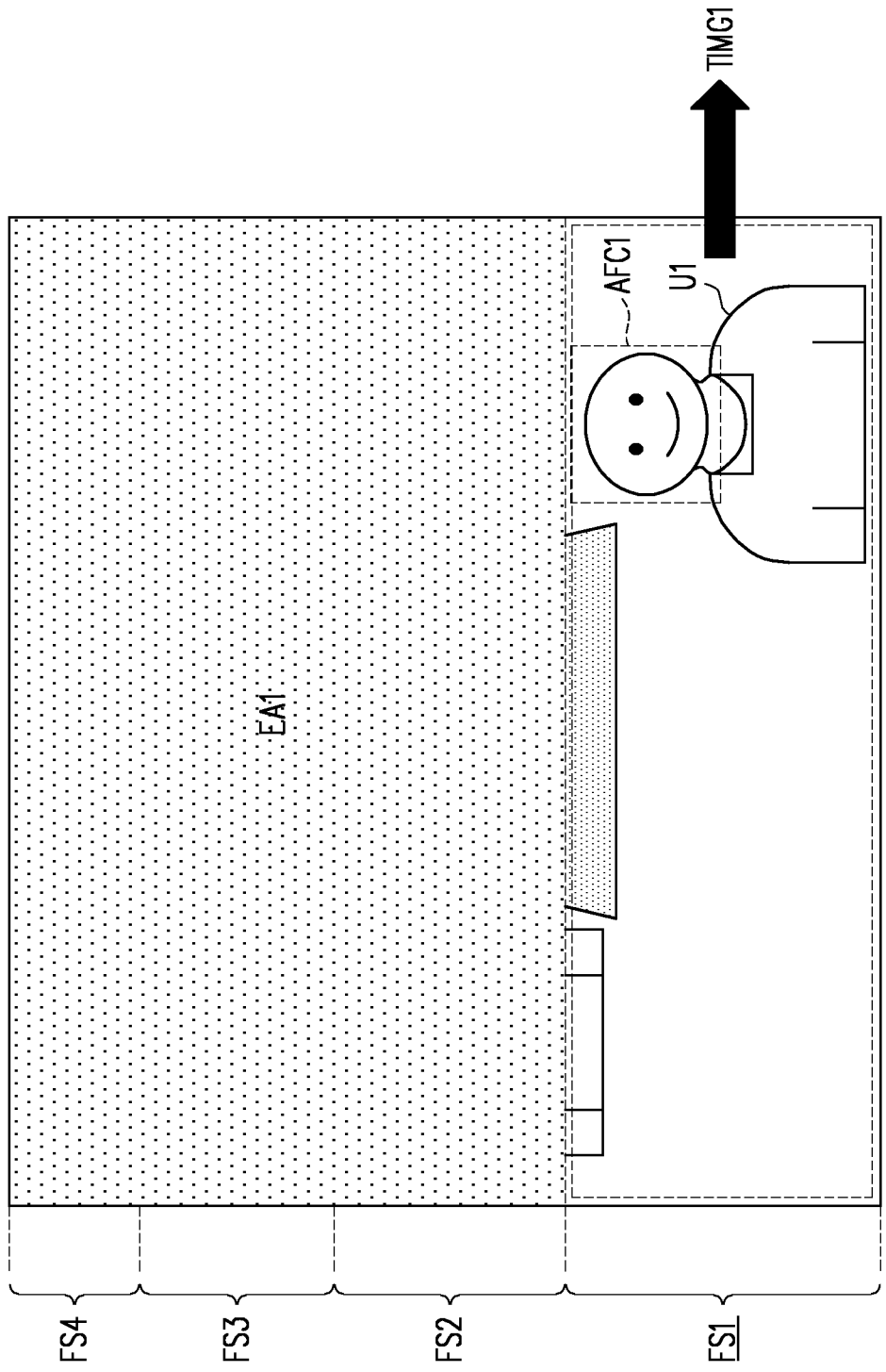
FIG. 5C is a schematic view of keeping a target sub-image TIMG1 in the target area TA1 corresponding to the focal section FS1 according to the first embodiment of the disclosure.

FIG. 5A is a schematic view of a captured image IMG1 corresponding to a focal section FS1 according to the first embodiment of the disclosure. FIG. 5B is a schematic view of recognizing a target area TA1 corresponding to the focal section FS1 in the image IMG1 according to the first embodiment of the disclosure. FIG. 5C is a schematic view of keeping a target sub-image TIMG1 in the target area TA1 corresponding to the focal section FS1 according to the first embodiment of the disclosure.

Referring to FIG. 5A, for example, assuming that the image capturing device 150(1) has captured the image IMG1, the user U1 is located in the focal section FS1, and a face image AFC1 of the user U1 is a clear image that has been focused. In this embodiment, the image capturing device 150(1) may ascertain whether the currently captured image has been focused (also referred to as in focus) according to a contrast detection operation. For example, the image capturing device 150(1) may find a target image with the highest contrast (contrast ratio) in different images projected on the photosensitive element of the image capturing device 150(1) corresponding to different positions by changing a position of a lens set of the lens of the image capturing device 150(1), and use the position of the lens set corresponding to the target image as a focus point (also referred to as an in-focus point), so as to use the focus point to capture the image. As a result, the face image AFC1 of the user U1 in the captured image IMG1 may be a clear image that has been focused.

Referring to FIG. 5B, the processor 110 may determine coordinate positions of multiple vertices (for example, points TA1(1) to TA1(4)) of the target area TA1 located in the image IMG1 in the image according to one or more of the height, the width, and the depth of the spatial information of the monitoring scene SC1, the focal section FS1 corresponding to the image capturing device 150(1), and the lens specification corresponding to the image capturing device 150(1), so as to determine the position (for example, a position corresponding to the focal section FS1 located at the bottom of the image IMG1), the shape (for example, a rectangle), and the side lengths of the target area TA1. An area outside the target area TA1 in the image IMG1 is regarded as a removal area EA1, and the image located in the removal area EA1 is not kept.

Referring to FIG. 5C, after recognizing the target area TA1 in the image IMG1, the processor 110 may keep the target sub-image TIMG1 in the target area TA1. Other sub-images in the removal area EA1 in image IMG1 are not kept or are deleted. It should be noted that, as described above, in the another embodiment, the image capturing device 150(1) may recognize the target area TA1 by itself. In addition, the image capturing device 150(1) may only keep and transmit the target sub-image IMG1 in the target area TA1 to the main memory 120, thereby reducing space consumption of the main memory 120.

Figure 6A:
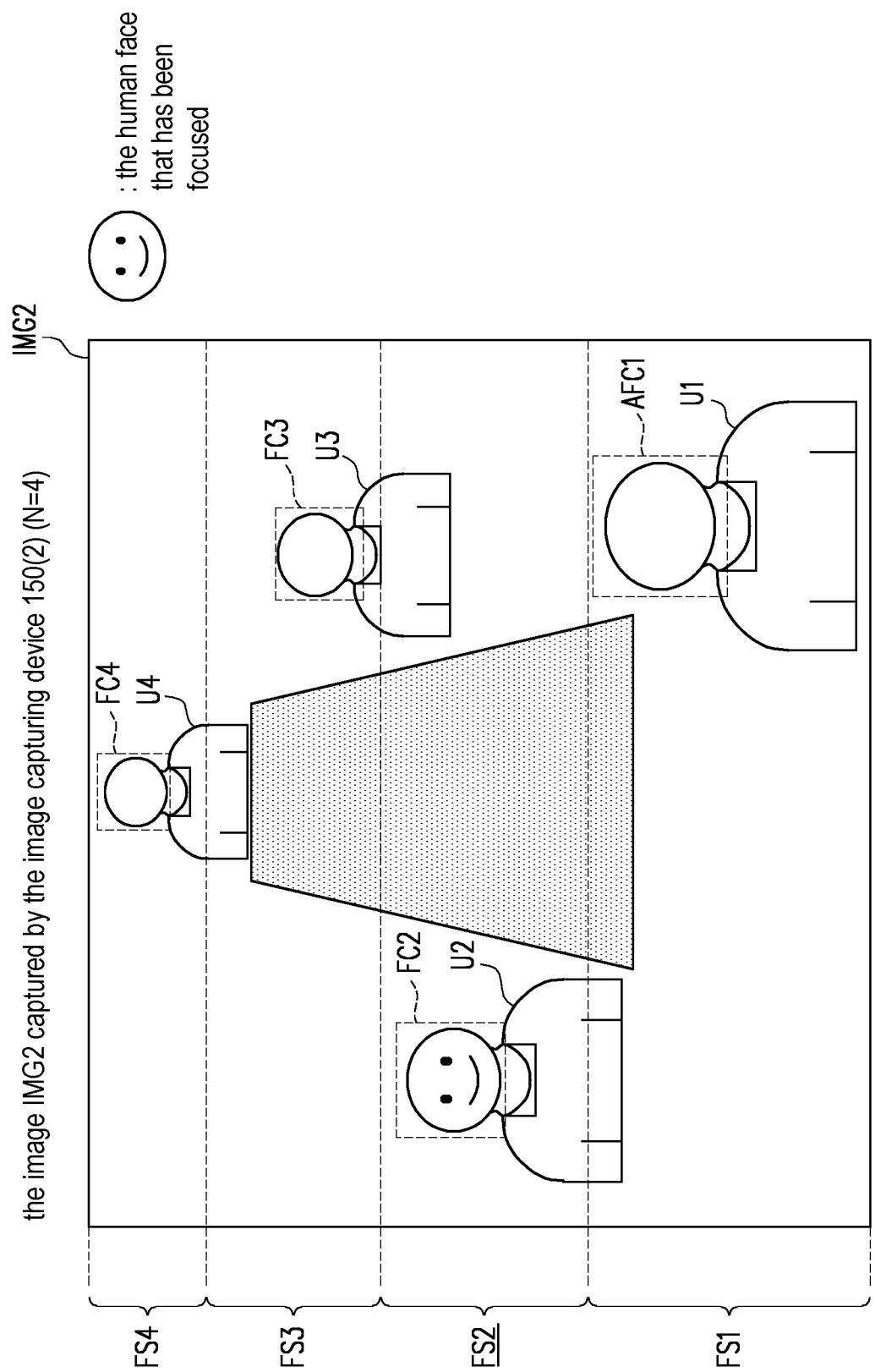
FIG. 6A is a schematic view of a captured image IMG2 corresponding to a focal section FS2 according to the first embodiment of the disclosure.
Figure 6B:
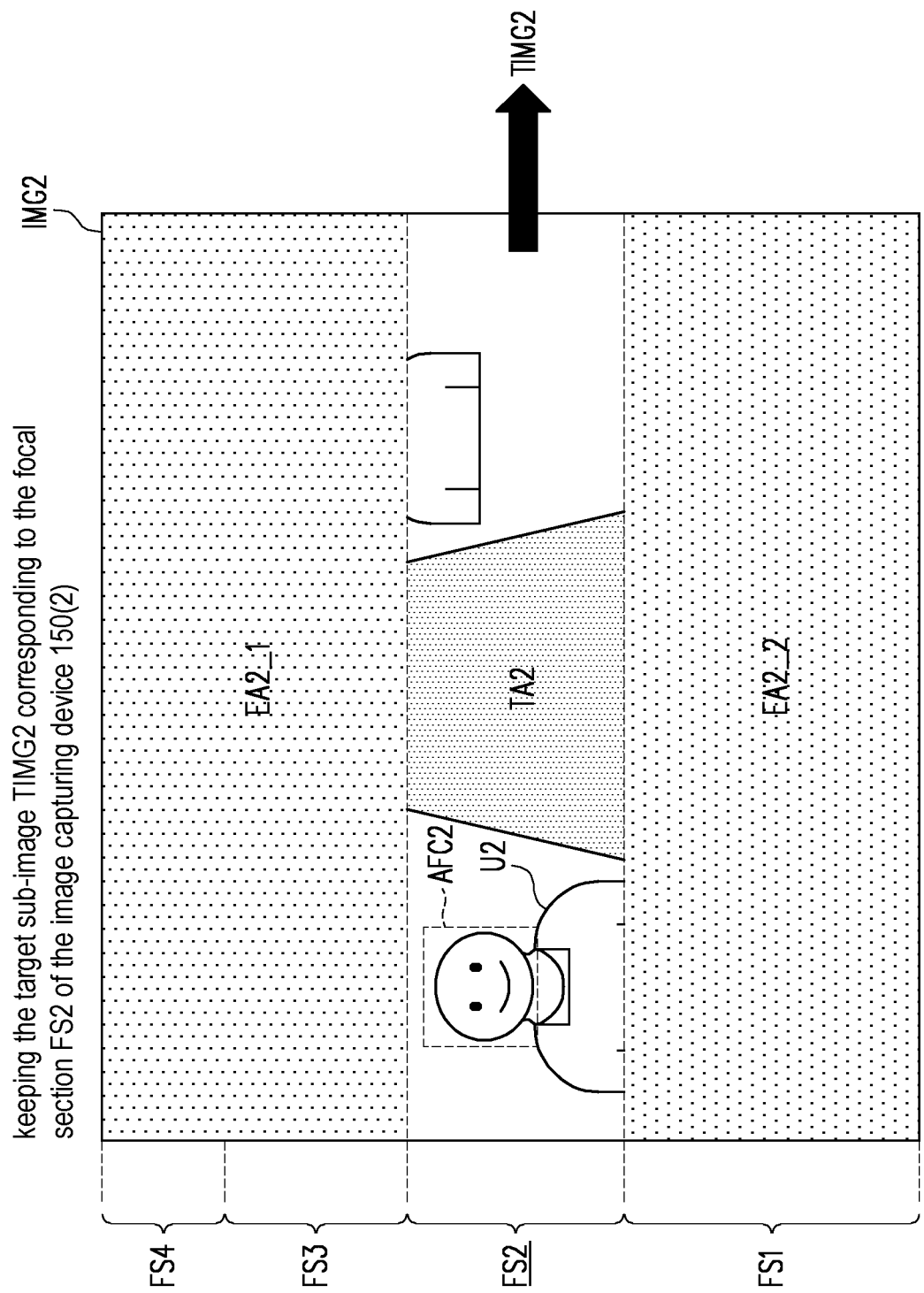
FIG. 6B is a schematic view of keeping a target sub-image TIMG2 in a target area TA2 corresponding to the focal section FS2 according to the first embodiment of the disclosure.
Figure 7A:
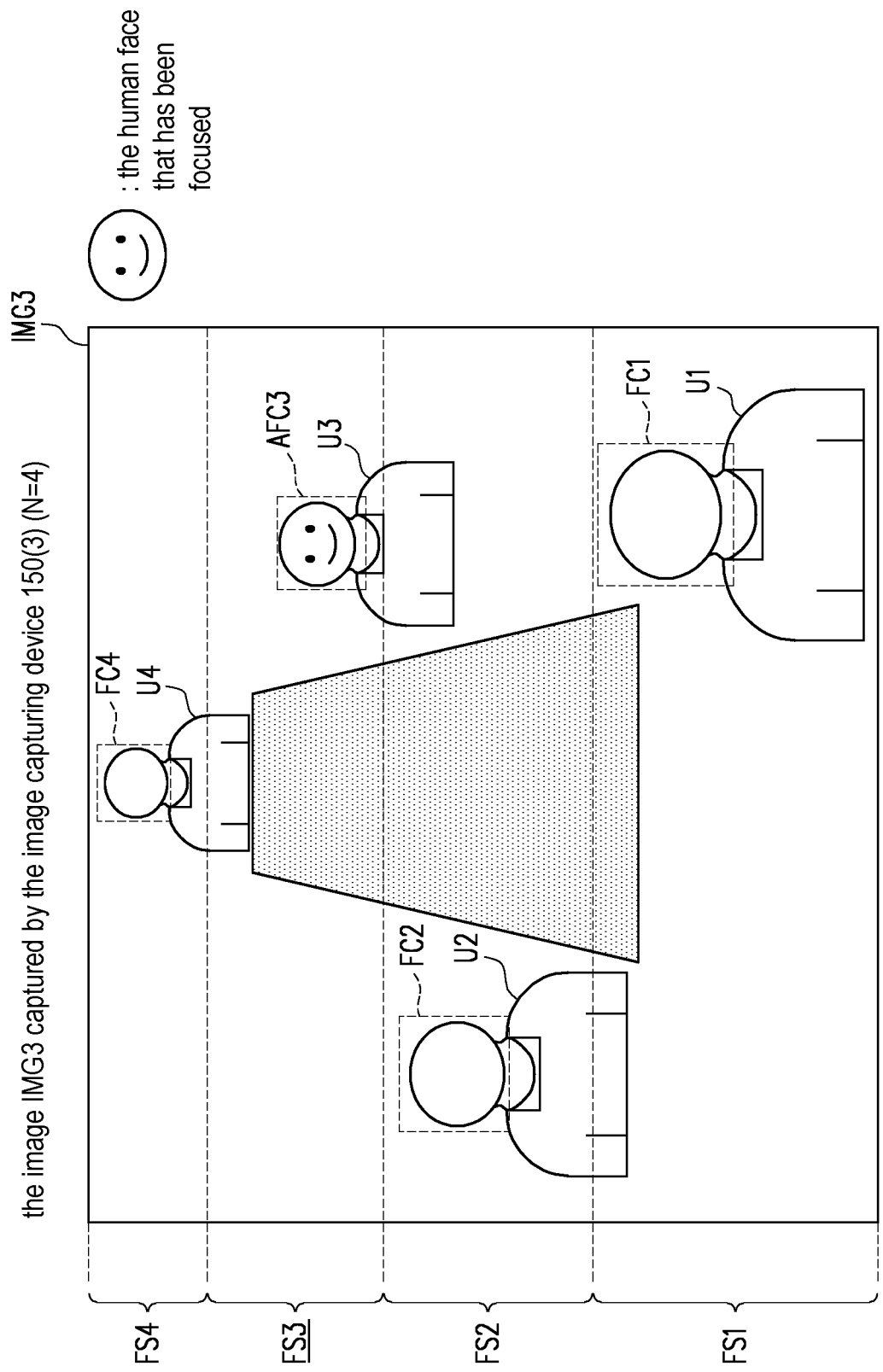
FIG. 7A is a schematic view of a captured image IMG3 corresponding to a focal section FS3 according to the first embodiment of the disclosure.
Figure 7B:
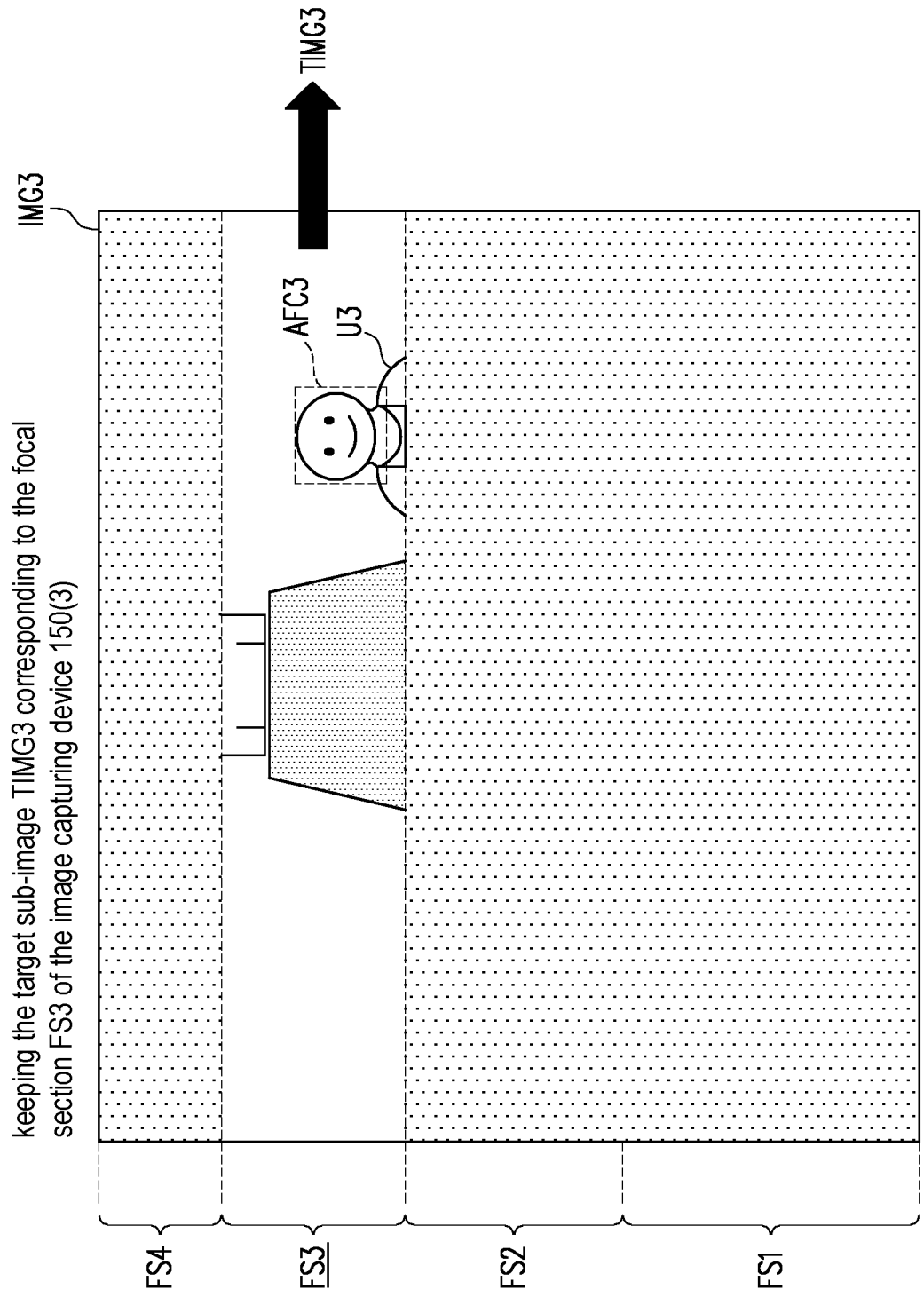
FIG. 7B is a schematic view of keeping a target sub-image TIMG3 in a target area TA3 corresponding to the focal section FS3 according to the first embodiment of the disclosure.
Figure 8A:
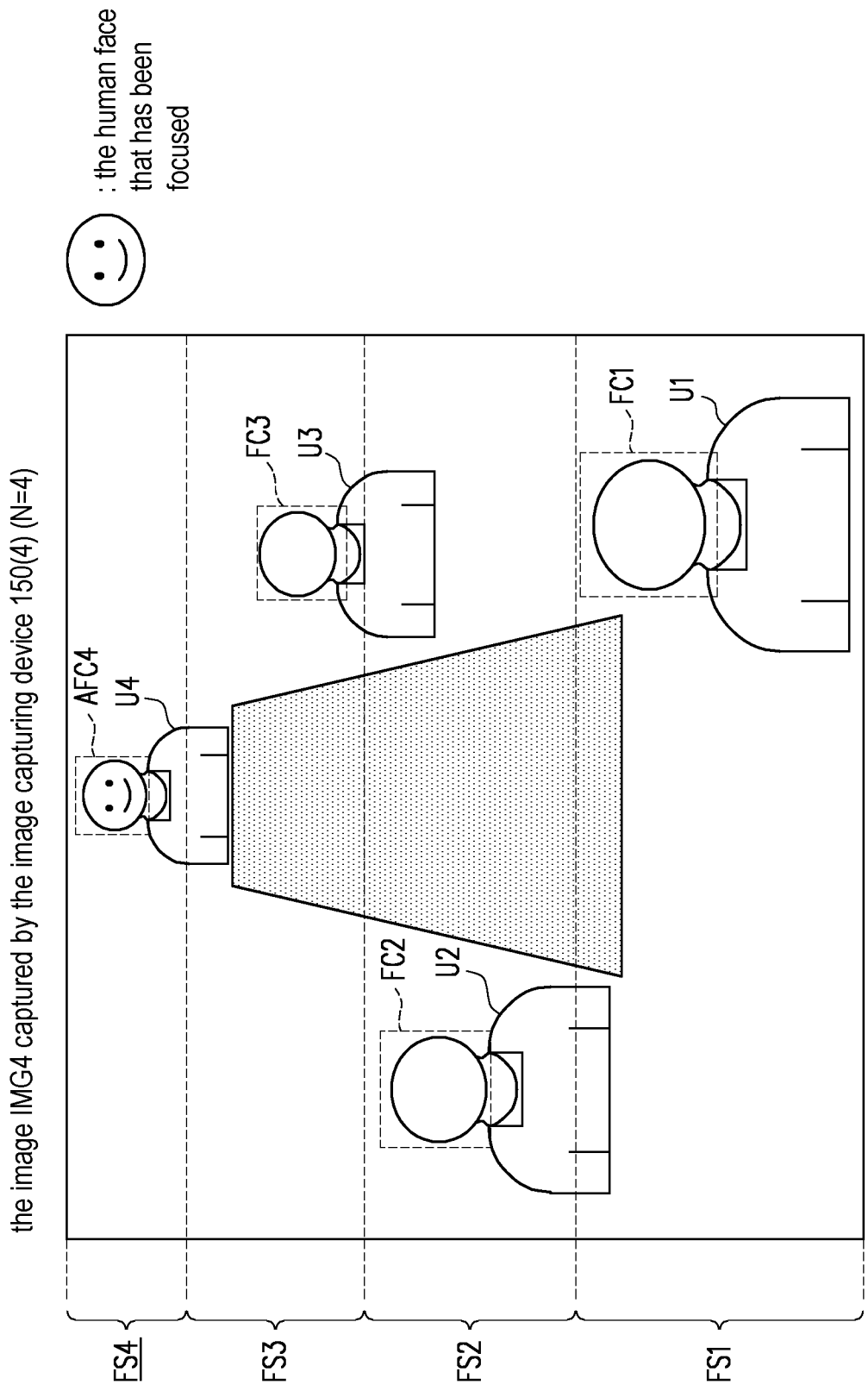
FIG. 8A is a schematic view of a captured image IMG4 corresponding to a focal section FS4 according to the first embodiment of the disclosure.
Figure 8B:
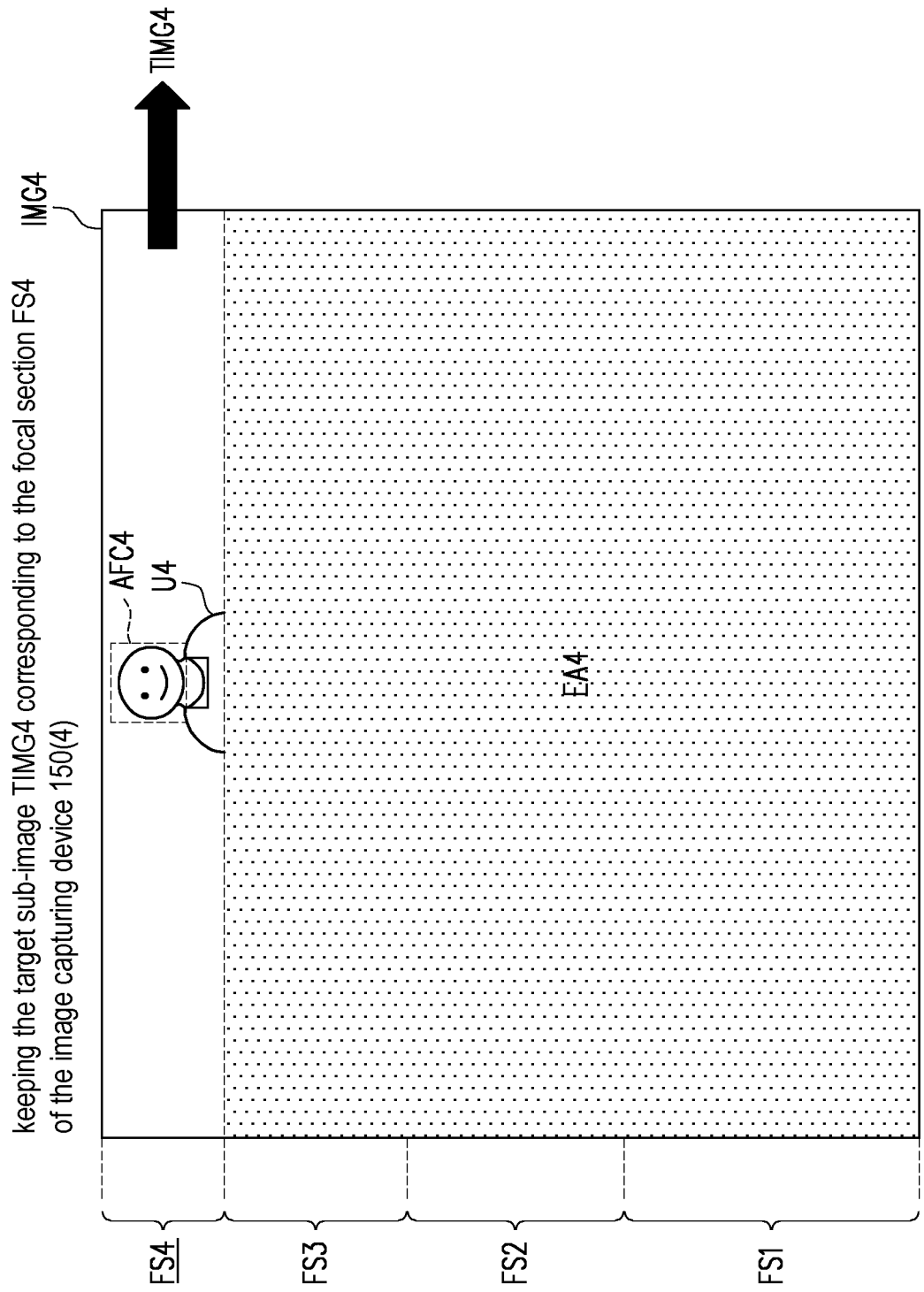
FIG. 8B is a schematic view of keeping a target sub-image TIMG4 in a target area TA4 corresponding to the focal section FS4 according to the first embodiment of the disclosure.

Referring to FIG. 6A, similarly, assuming that at the same time point, the image capturing device 150(2) has captured an image IMG2, the user U2 is located in the focal section FS2, and a face image AFC2 of the user U2 is a clear image that has been focused. Referring to FIG. 6B, after recognizing a target area TA2 in the image IMG2, the processor 110 may keep a target sub-image TIMG2 in the target area TA2. Referring to FIG. 7A, similarly, assuming that at the same time point, the image capturing device 150(3) has captured an image IMG3, the user U3 is located in the focal section FS3, and a face image AFC3 of the user U3 is a clear image that has been focused. Referring to FIG. 7B, after recognizing a target area TA3 in the image IMG3, the processor 110 may keep a target sub-image TIMG3 in the target area TA3. Referring to FIG. 8A, similarly, assuming that at the same time point, the image capturing device 150(4) has captured an image IMG4, the user U4 is located in the focal section FS4, and a face image AFC4 of the user U4 is a clear image that has been focused. Referring to FIG. 8B, after recognizing a target area TA4 in the image IMG4, the processor 110 may keep a target sub-image TIMG4 in the target area TA4.

Returning to FIG. 3 again, next, in step S307, the processor 110 directly generates a single reconstructed image corresponding to the time point according to the target sub-images. Specifically, in an embodiment, the processor 110 copies the target sub-images to a background image according to the focal sections to generate the reconstructed image. The target sub-images do not overlap with one another.

Figure 9:
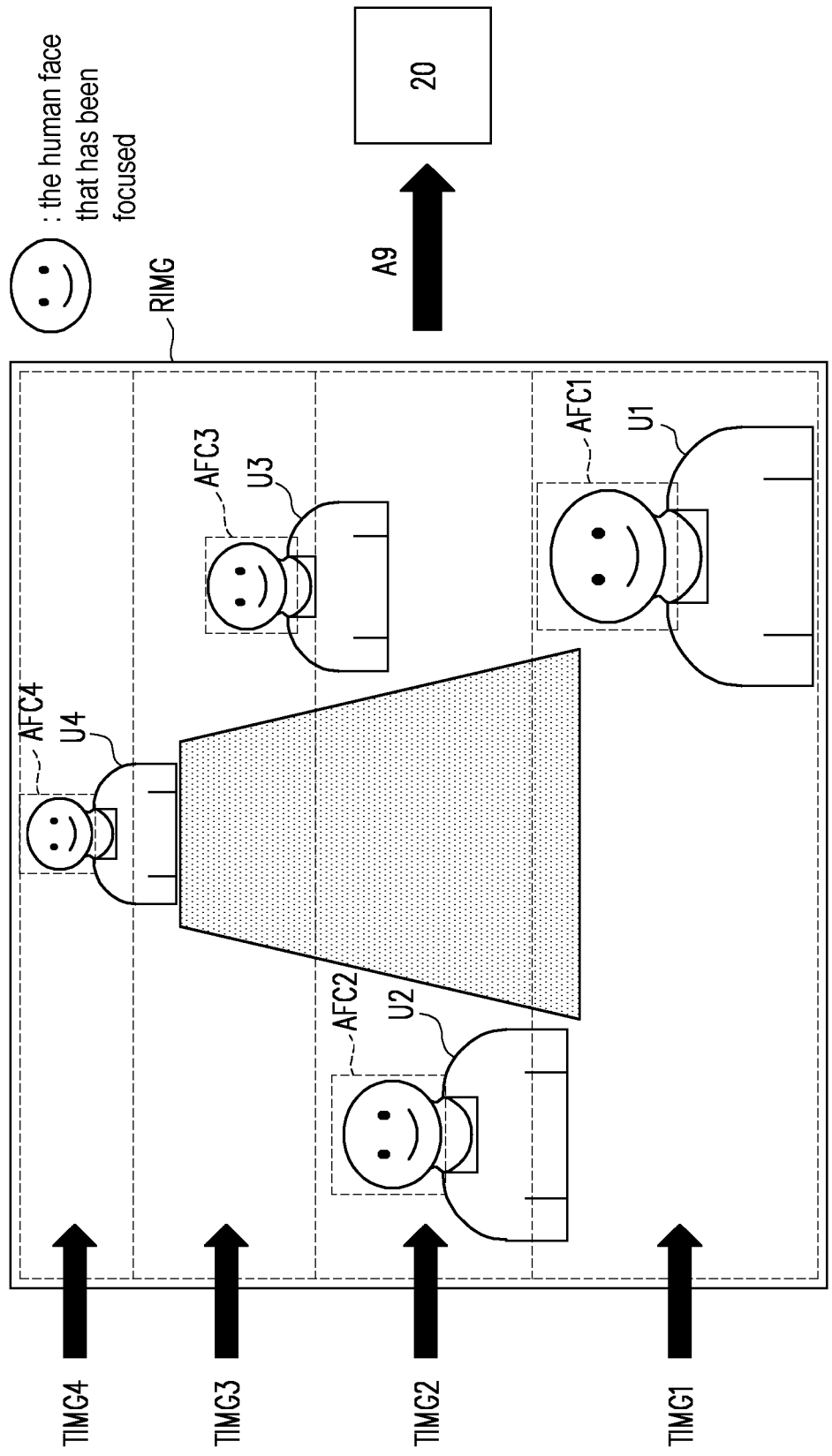
FIG. 9 is a schematic view of a reconstructed image generated according to multiple target sub-images according to the first embodiment of the disclosure.

FIG. 9 is a schematic view of a reconstructed image generated according to multiple target sub-images according to the first embodiment of the disclosure. Referring to FIG. 9, for example, the processor 110 may sequentially (for example, starting from a bottom of a background image RIMG to a top of the background image RIMG) copy the target sub-images TIMG1 to TIMG4 to the background image RIMG (for example, a blank image RIMG) according to the sequence of the focal sections to generate a reconstruction image RIMG. It is worth mentioning that images AFC1 to AFC4 of multiple target objects in the reconstructed image RIMG are all clear images that have been focused. In more detail, in an embodiment, the images AFC1 to AFC4 of the target objects are all greater than a predetermined pixel threshold. In addition, the predetermined pixel threshold is correspondingly set according to the image recognition operation performed by the AI image recognition device.

In addition, in another embodiment, the processor 110 may not need to sequentially copy the target sub-images TIMG1 to TIMG4 to the background image RIMG1 to generate the reconstructed image RIMG. For example, the processor 110 may copy the target sub-images TIMG1 to TIMG4 to the background image RIMG1 randomly or by using other rules to generate the reconstructed image RIMG.

After generating the reconstructed image RIMG, proceeding to step S309, the processor 110 outputs the reconstructed image RIMG. Specifically, the processor 110 may instruct the communication circuit unit 130 to transmit the reconstructed image RIMG to the AI image recognition device 20 through the established network connection (as shown by an arrow A9), so that the AI image recognition device 20 may perform the image recognition operation on the reconstructed image RIMG.

Figure 10:
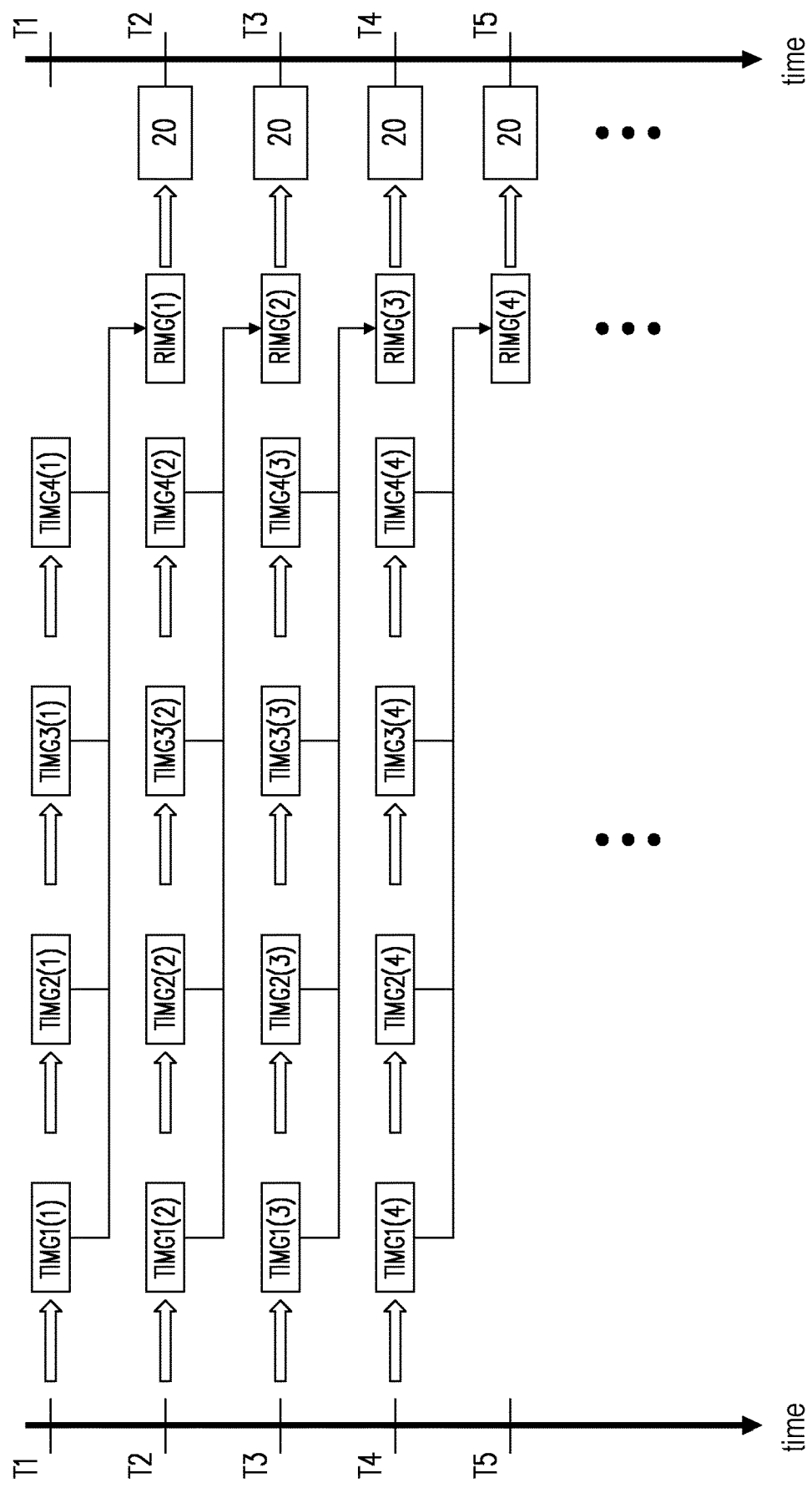
FIG. 10 is a schematic timing view of multiple image capturing operations according to the first embodiment of the disclosure.

FIG. 10 is a schematic timing view of multiple image capturing operations according to the first embodiment of the disclosure. Referring to FIG. 10, at a time point T1, the processor 110 obtains a target sub-image TIMG1(1) captured by the image capturing device 150(1), a target sub-image TIMG2(1) captured by the image capturing device 150(2), a target sub-image TIMG3(1) captured by the image capturing device 150(3), and a target sub-image TIMG4(1) captured by the image capturing device 150(4). At a time point T2, the processor 110 obtains a target sub-image TIMG1(2) captured by the image capturing device 150(1), a target sub-image TIMG2(2) captured by the image capturing device 150(2), a target sub-image TIMG3(2) captured by the image capturing device 150(3), and a target sub-image TIMG4(2) captured by the image capturing device 150(4). The processor 110 generates a reconstructed image RIMG (1) corresponding to the time point T1 according to the target sub-images IMG1(1) to IMG4(1), and the reconstructed image RIMG(1) is transmitted to the AI image recognition device 20. At a time point T3, the processor 110 obtains a target sub-image TIMG1(3) captured by the image capturing device 150(1), a target sub-image TIMG2(3) captured by the image capturing device 150(2), a target sub-image TIMG3(3) captured by the image capturing device 150(3), and a target sub-image TIMG4(3) captured by the image capturing device 150(4). The processor 110 generates a reconstructed image RIMG(2) corresponding to the time point T2 according to the target sub-images IMG1(2) to IMG4(2), and the reconstructed image RIMG(2) is transmitted to the AI image recognition device 20. At a time point T4, the processor 110 obtains a target sub-image TIMG1(4) captured by the image capturing device 150(1), a target sub-image TIMG2(4) captured by the image capturing device 150(2), a target sub-image TIMG3(4) captured by the image capturing device 150(3), and a target sub-image TIMG4(4) captured by the image capturing device 150(4). The processor 110 generates a reconstructed image RIMG (3) corresponding to the time point T3 according to the target sub-images IMG1(3) to IMG4(3), and the reconstructed image RIMG(3) is transmitted to the AI image recognition device 20. The rest may be derived by analog.

That is to say, assuming that each of the time points T1 to T4 corresponds to a time frame, in the first embodiment, it only takes a time length of two time frames to output the first reconstructed image to the AI image recognition device 20. In particular, in the first embodiment, it only takes one time frame to output the successive reconstructed images to the AI image recognition device 20 (as shown in FIG. 10, a time interval between the two adjacent reconstructed images is a time frame). In this way, it may be proved that compared with the conventional method, the electronic device and the image capturing method thereof provided by the disclosure may quickly and efficiently generate the reconstructed image for the image recognition operation.

The Second Embodiment

Most of hardware components in the second embodiment are the same as those in the first embodiment. Thus, details of the same hardware components will not be further reiterated in the following.

Figure 11:
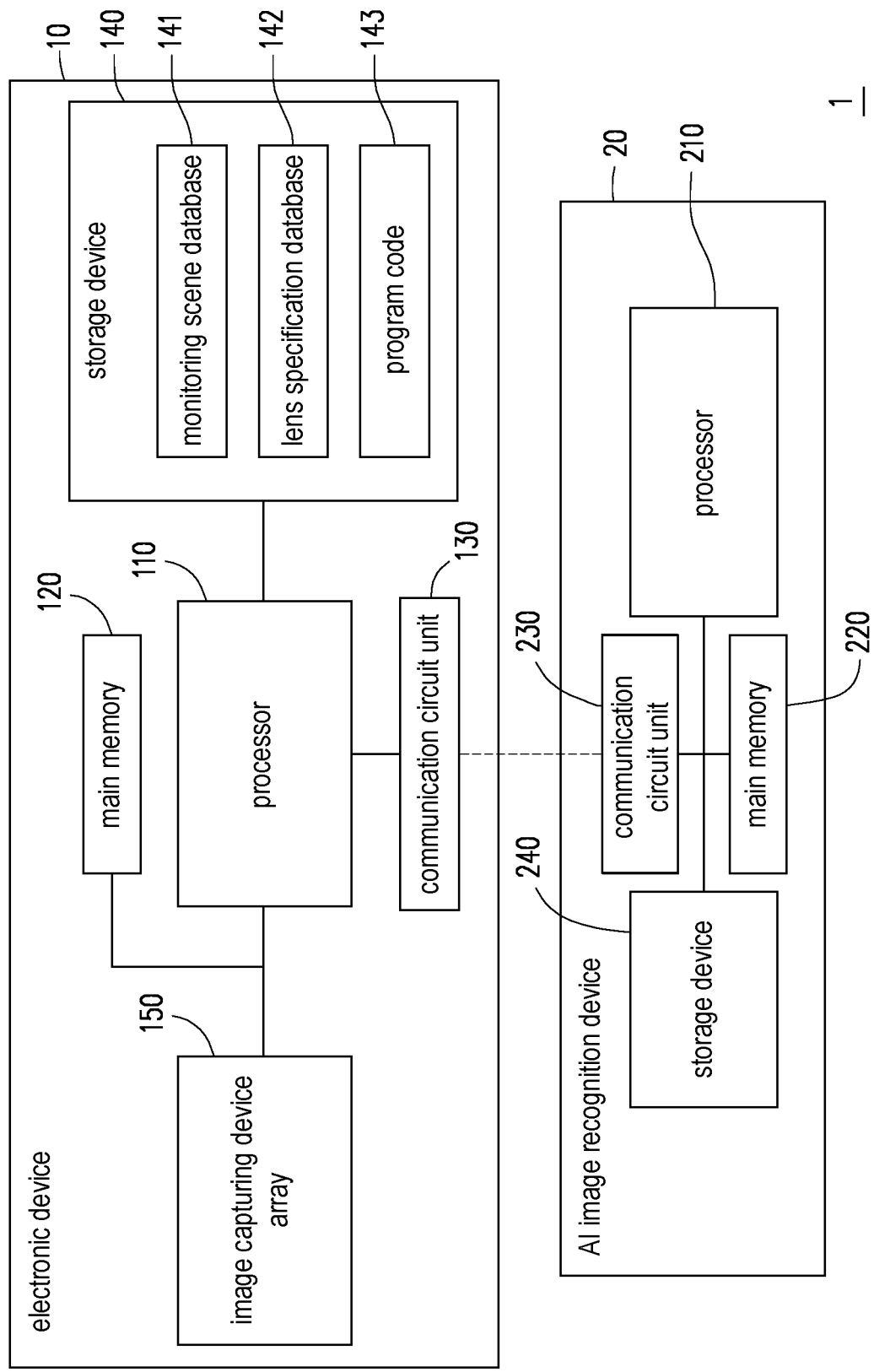
FIG. 11 is a schematic block view of an image recognition system according to the second embodiment of the disclosure.

FIG. 11 is a schematic block view of an image recognition system according to the second embodiment of the disclosure. Referring to FIG. 11, the difference between the second embodiment and the first embodiment is that in the second embodiment, the electronic device 10 only includes a zoomable image capturing device 150(1). In other words, the image capturing device 150 in the second embodiment needs to quickly switch a focal length to capture a monitoring scene.

Figure 12:
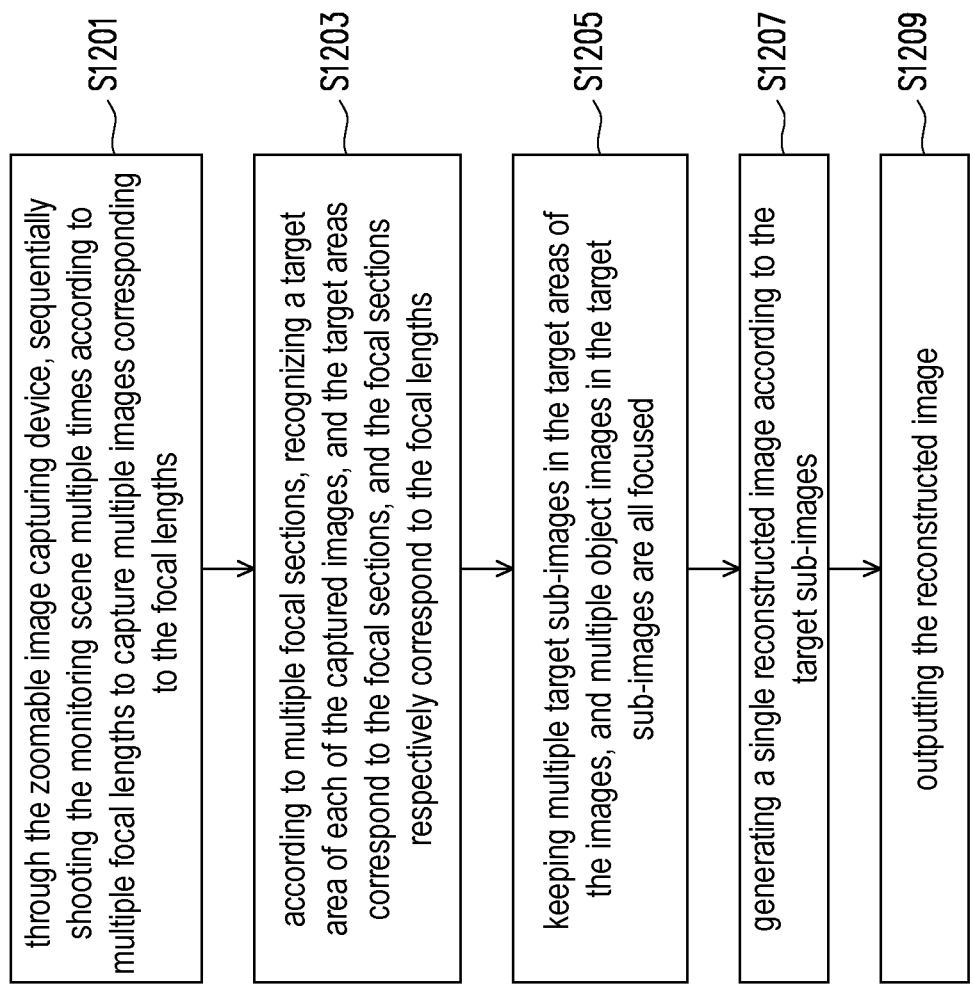
FIG. 12 is a flowchart of an image capturing method according to the second embodiment of the disclosure.

FIG. 12 is a flowchart of an image capturing method according to the second embodiment of the disclosure. Referring to FIG. 12, the steps of the image capturing method provided in the second embodiment are mostly similar to those of the image capturing method provided in the first embodiment (for example, step S1203 to step S1209 are the same as steps S303 to S309). Step S1201 is different from step S301.

In step S1201, through the zoomable image capturing device, the monitoring scene is sequentially shot multiple times according to multiple focal lengths to capture multiple images corresponding to the focal lengths.

Specifically, for ease of description, it is assumed that the image capturing device 150 has the focal length FL1 to the focal length FL4 (as shown in FIG. 4A). The image capturing device 150 may, according to the sequence of the focal length FL1 to the focal length FL4, first use the focal length FL1 to shoot the monitoring scene SC1 to obtain the image IMG1, use the focal length FL2 to shoot the monitoring scene SC1 to obtain the image IMG2, then use the focal length FL3 to shoot the monitoring scene SC1 to obtain the image IMG3, and finally use the focal length FL4 to shoot the monitoring scene SC1 to obtain the image IMG4. In addition, the processor 110 may correspondingly obtain the target sub-images TIMG1 to TIMG4 (steps S1203 to 1205) according to the corresponding focal sections FS1 to FS4, and generate and output the corresponding reconstructed image RIMG (steps S1207 to 1209).

Figure 13A:
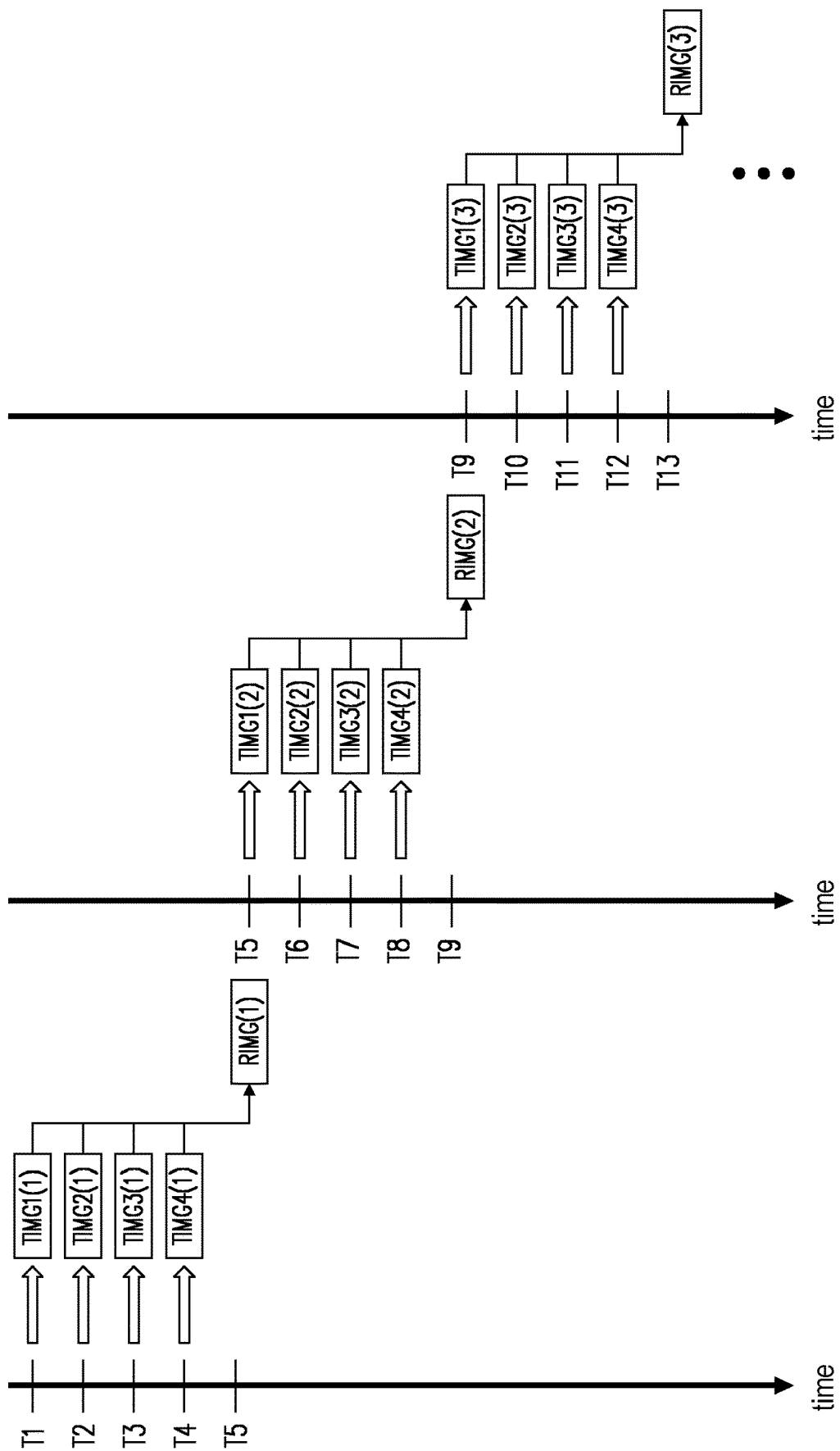
FIGS. 13A and 13B are schematic timing views of multiple image capturing operations according to the second embodiment of the disclosure.
Figure 13B:
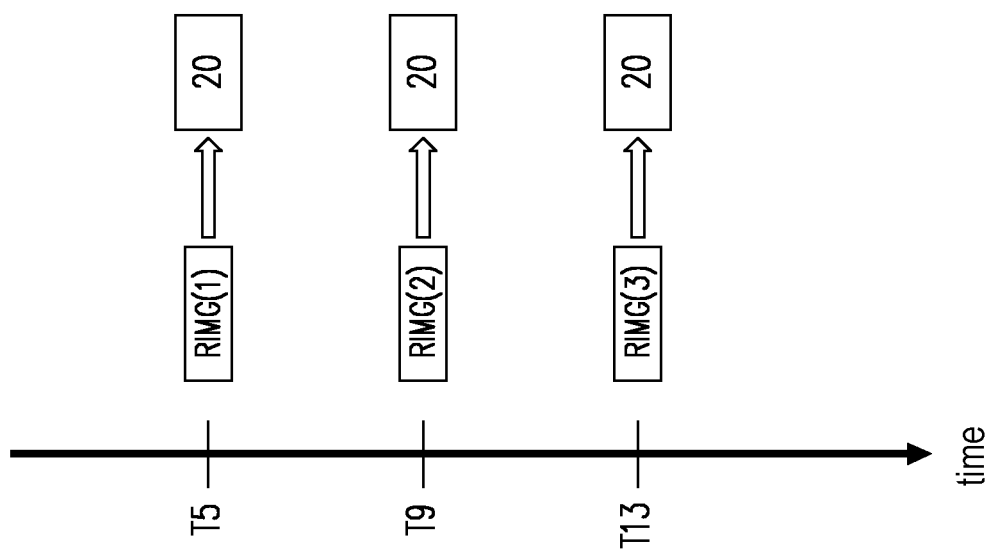

FIGS. 13A and 13B are schematic timing views of multiple image capturing operations according to the second embodiment of the disclosure. Referring to FIG. 13A, at a time point T1, the processor 110 obtains the target sub-image TIMG1(1) corresponding to the focal section FS1 captured by the image capturing device 150. At a time point T2, the processor 110 obtains the target sub-image TIMG2 (1) corresponding to the focal section FS2 captured by the image capturing device 150. At a time point T3, the processor 110 obtains the target sub-image TIMG3(1) corresponding to the focal section FS3 captured by the image capturing device 150. At a time point T4, the processor 110 obtains the target sub-image TIMG4(1) corresponding to the focal section FS4 captured by the image capturing device 150. At a time point T5, the processor 110 generates the reconstructed image RIMG(1) according to the target sub-images IMG1(1) to IMG4(1), and the processor 110 obtains the target sub-image TIMG1(2) corresponding to the focal section FS1 captured by the image capturing device 150. At a time point T6, the processor 110 obtains the target sub-image TIMG2(2) corresponding to the focal section FS2 captured by the image capturing device 150. At a time point T7, the processor 110 obtains the target sub-image TIMG3 (2) corresponding to the focal section FS3 captured by the image capturing device 150. At a time point T8, the processor 110 obtains the target sub-image TIMG4(2) corresponding to the focal section FS4 captured by the image capturing device 150. At a time point T9, the processor 110 generates the reconstructed image RIMG(2) according to the target sub-images IMG1(2) to IMG4(2), and the processor 110 obtains the target sub-image TIMG1(3) corresponding to the focal section FS1 captured by the image capturing device 150. At a time point T10, the processor 110 obtains the target sub-image TIMG2(3) corresponding to the focal section FS2 captured by the image capturing device 150. At a time point T11, the processor 110 obtains the target sub-image TIMG3(3) corresponding to the focal section FS3 captured by the image capturing device 150. At a time point T12, the processor 110 obtains the target sub-image TIMG4 (3) corresponding to the focal section FS4 captured by the image capturing device 150. At a time point T9, the processor 110 generates the reconstructed image RIMG(3) according to the target sub-images IMG1(3) to IMG4(3). The rest may be derived by analog. Referring to FIG. 13B, the reconstructed images RIMG(1) to RIMG(3) that are generated may be respectively output to the AI image recognition device 20 at the time points T5, T9, and T13.

That is to say, assuming that each of the time points T1 to T4 corresponds to a time frame, in the second embodiment, it only takes four time frames to output a reconstructed image to the AI image recognition device 20. Although the speed of generating the reconstructed image in the second embodiment is one-fourth that of generating the reconstructed image in the first embodiment, the hardware cost for disposing the image capturing device in the second embodiment is also one-fourth of that in the first embodiment. On the whole, regardless of the first or the second embodiment, compared with the convention method, a lot of time and resources for capturing the qualified images may be saved, thereby improving the efficiency of the overall image recognition system.

Based on the above, the image capturing method and electronic device provided by the embodiments of the disclosure may shoot the monitoring scene according to the focal lengths to capture the images, and keep the target sub-image of each of the images according to the focal sections respectively corresponding to the focal lengths to directly generate and output the reconstructed image according to the target sub-images. In this way, without analyzing the images and not attaching/stitching the target sub-images, it is possible to quickly and efficiently enable the object images at multiple depths in the generated reconstructed image to be focused and clear, thereby improving the accuracy of the image recognition operation using the reconstructed image.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image capturing method suitable for an electronic device, wherein the electronic device comprises a plurality of image capturing devices with a fixed focal length, wherein the plurality of image capturing devices respectively use a plurality of different focal lengths to shoot, and the method comprises:

shooting a monitoring scene at the same time through the plurality of image capturing devices respectively corresponding to the plurality of focal lengths to capture a plurality of images corresponding to the plurality of focal lengths at a same time point, wherein a total number of the plurality of images is equal to a total number of the plurality of focal lengths;

recognizing a target area of each of the plurality of captured images according to a plurality of focal sections, wherein the plurality of target areas correspond to the plurality of focal sections, and the plurality of focal sections respectively correspond to the plurality of focal lengths;

keeping a plurality of target sub-images in the plurality of target areas of the plurality of images, wherein a plurality of object images in the plurality of target sub-images are all focused;

directly generating a single reconstructed image corresponding to the time point according to the plurality of target sub-images; and outputting the reconstructed image.

2. The image capturing method according to claim 1, wherein the electronic device further comprises a storage device, wherein the storage device stores a lens specification database, and the lens specification database records a plurality of lens specifications of the plurality of image capturing devices, wherein the plurality of focal sections are determined according to the focal length of each of the plurality of image capturing devices, the plurality of lens specifications, and a total number of the plurality of image capturing devices, wherein a first focal length front distance from a starting point of a first focal section in the plurality of focal sections to a first focal length of a first image capturing device in the plurality of image capturing devices and a first focal length back distance from an end point of the first focal section to the first focal length are determined according to a first lens specification of the first image capturing device and the total number of the plurality of image capturing devices.

3. The image capturing method according to claim 2, wherein the storage device stores a monitoring scene database, and the monitoring scene database records spatial information of the monitoring scene, wherein the spatial information comprises a height, a width, and a depth of the monitoring scene, wherein recognizing the target area of each of the plurality of captured images comprises:

determining a position, a shape, and a size of the target area of each of the plurality of images according to the spatial information of the monitoring scene, the plurality of focal sections corresponding to the plurality of image capturing devices, and the plurality of lens specifications corresponding to the plurality of image capturing devices, wherein for a first image in the plurality of images captured by the first image capturing device, determining a first position, a first shape, and a plurality of side lengths of a first target area in the first image according to the depth and the width of the spatial information of the monitoring scene, the first focal section corresponding to the first image capturing device, and the first lens specification corresponding to the first image capturing device.

4. The image capturing method according to claim 1, wherein directly generating the single reconstructed image corresponding to the time point according to the plurality of target sub-images comprises:

copying the plurality of target sub-images to a background image according to the plurality of focal sections to generate the reconstructed image, wherein the plurality of target sub-images do not overlap with one another.

5. The image capturing method according to claim 1, wherein a pixel amount of each of one or more target objects in each of the plurality of images is greater than a predetermined pixel threshold.

6. An image capturing method suitable for an electronic device, wherein the electronic device comprises a zoomable image capturing device, and the method comprises:

sequentially shooting a monitoring scene a plurality of times according to a plurality of focal lengths through the image capturing device to capture a plurality of images corresponding to the plurality of focal lengths, wherein a total number of the plurality of images is equal to a total number of the plurality of focal lengths, and a plurality of time points of the plurality of images are continuous;

recognizing a target area of each of the plurality of captured images according to a plurality of focal sections, wherein the plurality of target areas correspond to the plurality of focal sections, and the plurality of focal sections respectively correspond to the plurality of focal lengths;

keeping a plurality of target sub-images in the plurality of target areas of the plurality of images, wherein a plurality of object images in the plurality of target sub-images are all focused;

directly generating a single reconstructed image according to the plurality of target sub-images; and outputting the reconstructed image.

7. The image capturing method according to claim 6, wherein the electronic device further comprises a storage device, wherein the storage device stores a lens specification database, and the lens specification database records a plurality of lens specifications of the image capturing device corresponding to the plurality of focal lengths, wherein the plurality of focal sections are determined according to the plurality of focal lengths, the plurality of lens specifications, and a total number of the plurality of image capturing devices, wherein a first focal length front distance from a starting point of a first focal section in the plurality of focal sections to a first focal length in the image capturing device and a first focal length back distance from an end point of the first focal section to the first focal length are determined according to a first lens specification of the image capturing device and the total number of the plurality of image capturing devices.

8. The image capturing method according to claim 7, wherein the storage device stores a monitoring scene database, and the monitoring scene database records spatial information of the monitoring scene, wherein the spatial information comprises a height, a width, and a depth of the monitoring scene, wherein recognizing the target area of each of the plurality of captured images comprises:

determining a position, a shape, and a size of the target area of each of the plurality of images according to the spatial information of the monitoring scene, the plurality of focal sections corresponding to the image capturing device, and the plurality of lens specifications corresponding to the image capturing device, wherein for a first image in the plurality of images, determining a first position, a first shape, and a plurality of side lengths of a first target area in the first image according to the depth and the width of the spatial information of the monitoring scene, the first focal section, and the first lens specification.

9. The image capturing method according to claim 6, wherein directly generating the single reconstructed image corresponding to the time point according to the plurality of target sub-images comprises:

copying the plurality of target sub-images to a background image according to the plurality of focal sections to generate the reconstructed image, wherein the plurality of target sub-images do not overlap with one another.

10. The image capturing method according to claim 6, wherein a pixel amount of each of one or more target objects in each of the plurality of images is greater than a predetermined pixel threshold.

11. An electronic device, comprising:

a plurality of image capturing devices with a fixed focal length, wherein the plurality of image capturing devices are configured to respectively use a plurality of different focal lengths to shoot;

a storage device configured to store data, wherein the data comprises a plurality of program codes; and a processor, wherein the processor is configured to access and execute the plurality of program codes to implement an image capturing method, wherein the plurality of image capturing devices are configured to shoot a monitoring scene at the same time to capture a plurality of images corresponding to the plurality of focal lengths at a same time point, wherein a total number of the plurality of images is equal to a total number of the plurality of focal lengths, wherein the processor is configured to recognize a target area of each of the plurality of captured images according to a plurality of focal sections, wherein the plurality of target areas correspond to the plurality of focal sections, and the plurality of focal sections respectively correspond to the plurality of focal lengths, wherein the processor is further configured to keep a plurality of target sub-images in the plurality of target areas of the plurality of images, wherein a plurality of object images in the plurality of target sub-images are all focused, wherein the processor is further configured to directly generate a single reconstructed image corresponding to the time point according to the plurality of target sub-images, wherein the processor is further configured to output the reconstructed image.

12. An electronic device, comprising:

a zoomable image capturing device, wherein the image capturing device selects one of a plurality of focal lengths to shoot;

a storage device configured to store data, wherein the data comprises a plurality of program codes; and a processor, wherein the processor is configured to access and execute the plurality of program codes to implement an image capturing method, wherein the image capturing devices is configured to sequentially shoot a monitoring scene a plurality of times according to the plurality of focal lengths to capture a plurality of images corresponding to the plurality of focal lengths, wherein a total number of the plurality of images is equal to a total number of the plurality of focal lengths, and a plurality of time points of the plurality of images are continuous, wherein the processor is further configured to recognize a target area of each of the plurality of captured images according to the plurality of focal sections, wherein the plurality of target areas correspond to the plurality of focal sections, and the plurality of focal sections respectively correspond to the plurality of focal lengths, wherein the processor is further configured to keep a plurality of target sub-images in the plurality of target areas of the plurality of images, wherein a plurality of object images in the plurality of target sub-images are all focused, wherein the processor is further configured to directly generate a single reconstructed image according to the plurality of target sub-images, wherein the processor is further configured to output the reconstructed image.

* * * * *